US 8,345,271 B2

(12) United States Patent
Mori

(10) Patent No.: US 8,345,271 B2
(45) Date of Patent: Jan. 1, 2013

(54) PRINTING CONTROL APPARATUS FOR ASSIGNING PARAMETER SELECTIONS TO SPECIFIC KEYS

(75) Inventor: Hiromi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1173 days.

(21) Appl. No.: 11/476,563

(22) Filed: Jun. 29, 2006

(65) Prior Publication Data

US 2007/0002357 A1     Jan. 4, 2007

(30) Foreign Application Priority Data

Jun. 30, 2005  (JP) ................................ P2005-191958

(51) Int. Cl.
*G06F 3/12*    (2006.01)
(52) U.S. Cl. .......... 358/1.13; 358/1.9; 358/1.15; 399/81; 399/82
(58) Field of Classification Search ................... 358/1.9, 358/1.13, 1.15; 399/81, 82
See application file for complete search history.

(56) References Cited

U.S. PATENT DOCUMENTS

| | | | | |
|---|---|---|---|---|
| 5,630,032 | A * | 5/1997 | Yamaguchi et al. | 358/1.16 |
| 6,848,081 | B1 | 1/2005 | Yoda et al. | |
| 7,251,045 | B2 * | 7/2007 | Yamamura et al. | 358/1.13 |
| 8,016,499 | B2 * | 9/2011 | Narusawa | 400/76 |
| 2002/0015598 | A1 | 2/2002 | Maeda et al. | |
| 2002/0075512 | A1 * | 6/2002 | Terasaka | 358/1.15 |
| 2002/0136563 | A1 * | 9/2002 | Maeda et al. | 399/81 |
| 2002/0156870 | A1 * | 10/2002 | Boroumand et al. | 709/219 |
| 2003/0214664 | A1 * | 11/2003 | Moffatt | 358/1.13 |
| 2004/0021888 | A1 * | 2/2004 | Chang | 358/1.13 |
| 2004/0080547 | A1 * | 4/2004 | Goto | 345/827 |
| 2004/0165220 | A1 * | 8/2004 | Fukuda | 358/400 |
| 2004/0179212 | A1 * | 9/2004 | Kurashina | 358/1.7 |
| 2004/0263480 | A1 * | 12/2004 | Pagan | 345/172 |
| 2005/0007465 | A1 | 1/2005 | Terasawa | |
| 2005/0071785 | A1 * | 3/2005 | Chadzelek et al. | 715/854 |
| 2005/0146731 | A1 * | 7/2005 | Mitani | 358/1.1 |

(Continued)

FOREIGN PATENT DOCUMENTS

EP    0 352 991 A2    1/1990

(Continued)

OTHER PUBLICATIONS

Japanese Notification of Reasons for Refusal, w/ partial English translation thereof, issued in Japanese Patent Application No. JP 2005-191958 dated Dec. 2, 2008.

(Continued)

*Primary Examiner* — Benjamin O Dulaney
(74) *Attorney, Agent, or Firm* — Baker Botts L.L.P.

(57) ABSTRACT

A printing control apparatus has an input unit with several keys, and a printing control unit that receives a print command from the input unit. The print command initiates a print operation at a printer. A determination unit of the printing control apparatus determines whether a predetermined key is pressed at the same time that the print command is received. If the determination unit determines that the predetermined key is pressed at the same time that the print command is received, an update unit updates a setup value of a parameter relating to a printing mode to a specific value from a predetermined value. The printer executes the print operation in accordance with the setup value of the parameter.

11 Claims, 16 Drawing Sheets

U.S. PATENT DOCUMENTS

| | | | | |
|---|---|---|---|---|
| 2005/0219640 A1* | 10/2005 | Kasatani | ........................ | 358/402 |
| 2006/0087680 A1* | 4/2006 | Maeda | ........................ | 358/1.15 |
| 2006/0117271 A1* | 6/2006 | Keim | ........................ | 715/789 |
| 2006/0285126 A1* | 12/2006 | Braswell et al. | ........................ | 358/1.1 |
| 2006/0285143 A1* | 12/2006 | Han et al. | ........................ | 358/1.13 |

FOREIGN PATENT DOCUMENTS

| | | |
|---|---|---|
| EP | 1 450 548 A1 | 8/2004 |
| JP | 6-242896 A | 9/1994 |
| JP | 8-185294 | 7/1996 |
| JP | 2001-228992 | 8/2001 |
| JP | 2002-132100 A | 5/2002 |
| JP | 2003-308183 | 10/2003 |
| JP | 2004-343160 | 12/2004 |

OTHER PUBLICATIONS

Chinese Office Action, with English translation, issued in Chinese Patent Application No. CN 200610099692.5, mailed Nov. 30, 2007.

"Shift Your Focus with these Keyboard Tricks", XP55016087, Mar. 18, 2002 (retrieved on Jan. 10, 2012).

"Shift Your Focus with these Keyboard Tricks—corresponding publication date", XP55016089, Jan. 10, 2012, (retrieved on Jan. 10, 2012).

European Patent Office, Office Action for European Patent Application No. 06253397.1 (counterpart to above-captioned patent application), mailed Jan. 19, 2012.

* cited by examiner

FIG. 2A

[PRINTING SETUP DATA]

| SETUP ID | REGISTRATION VALUE |
|---|---|
| ... | ... |
| (ID OF LAYOUT) | 1 |
| ... | ... |
| ... | ... |
| (ID OF PAPER MEDIUM) | m |
| ... | ... |

FIG. 2B

[USER DEFINITION DATA]

| ITEM NUMBER | SETUP ITEM TITLE | SETUP ID | REGISTRATION VALUE | KEY SETUP VALUE |
|---|---|---|---|---|
| 1 | ... | ... | ... | SHIFT+CTRL |
| 2 | ID OF LAYOUT | (ID OF LAYOUT) | 2 | SHIFT |
| 3 | ... | ... | ... | ... |
| ... | ... | ... | ... | ALT |
| n | ID OF PAPER MEDIUM | (ID OF PAPER MEDIUM) | k | CTRL |

FIG. 12A

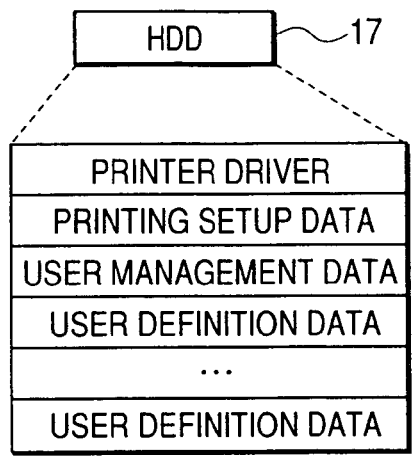

HDD — 17

- PRINTER DRIVER
- PRINTING SETUP DATA
- USER MANAGEMENT DATA
- USER DEFINITION DATA
- ...
- USER DEFINITION DATA

FIG. 12B

[USER MANAGEMENT DATA]

| RECORD NUMBER | TITLE | KEY SETUP VALUE | DEFINITION DATA STORAGE LOCATION |
|---|---|---|---|
| 1 | USER 1 | CTRL+ALT | ... |
| 2 | USER 2 | SHIFT | ... |
| 3 | USER 3 | CTRL | ... |
| ... | ... | SHIFT+CTRL | ... |
| n | ... | ... | ... |

FIG. 12C

[USER DEFINITION DATA]

| ITEM NUMBER | SETUP ITEM TITLE | SETUP ID | REGISTRATION VALUE |
|---|---|---|---|
| 1 | ... | ... | ... |
| 2 | ID OF LAYOUT | (ID OF LAYOUT) | 2 |
| 3 | ... | ... | ... |
| ... | ... | ... | ... |
| n | ID OF PAPER MEDIUM | (ID OF PAPER MEDIUM) | k |

FIG. 14A

| USER SETUP | | |
|---|---|---|
| TITLE | KEY ALLOCATION | |
| USER 1 | CTRL+ALT | REGISTER |
| USER 2 | SHIFT | UPDATE |
| USER 3 | CTRL | DELETE |
| USER 4 | SHIFT+CTRL | CANCEL |

(CURSOR)

FIG. 14B

INDIVIDUAL USER SETUP

| TITLE | |
|---|---|
| PAPER SIZE | A4 |
| LAYOUT | 2 PAGES |
| PRINTING ORIENTATION | ○ PORTRAIT  ⦿ LANDSCAPE |
| NUMBER OF COPIES | 1 |
| PAPER MEDIUM | NORMAL |
| KEY ALLOCATION | CTRL |

OK   CANCEL

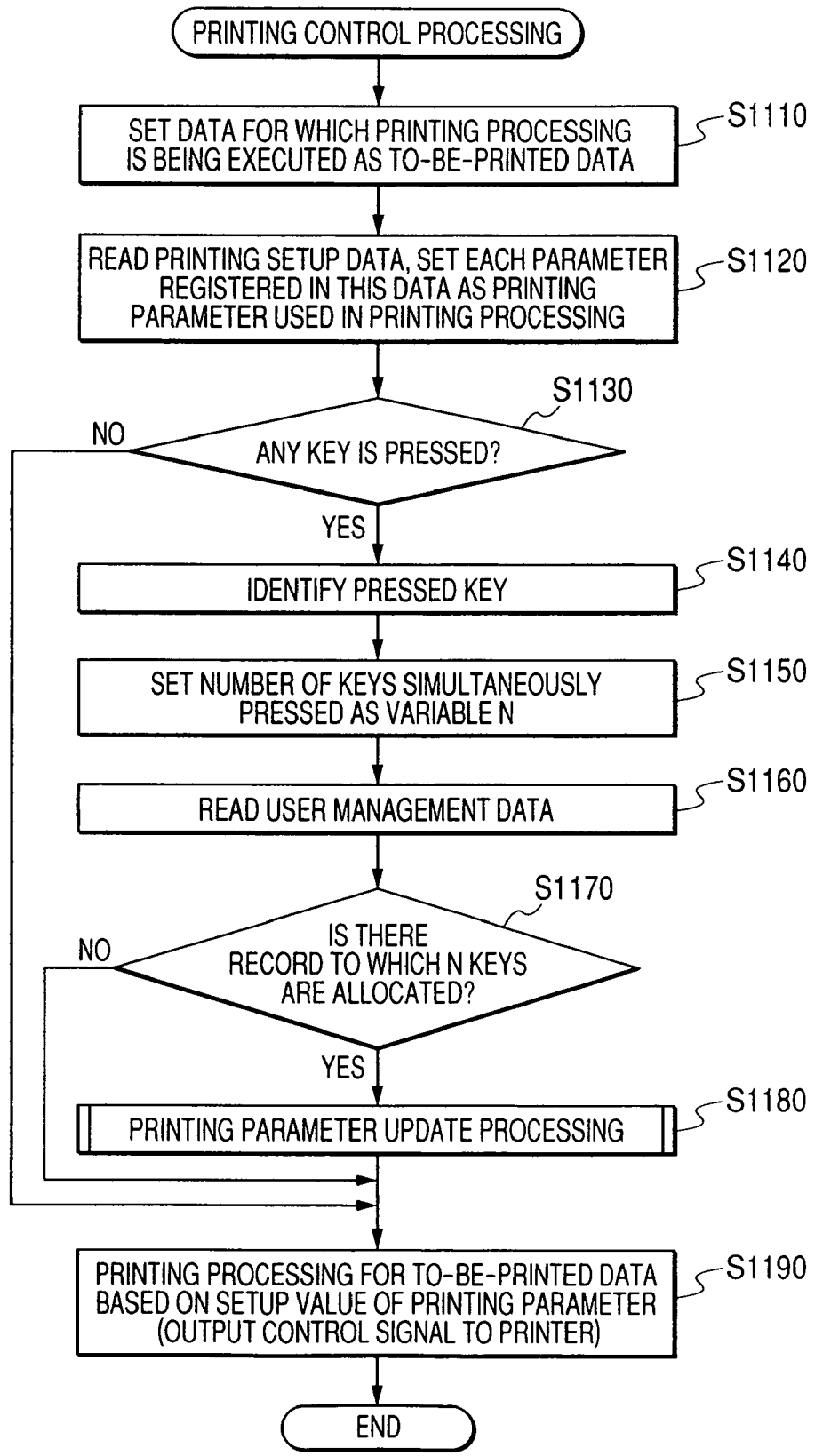

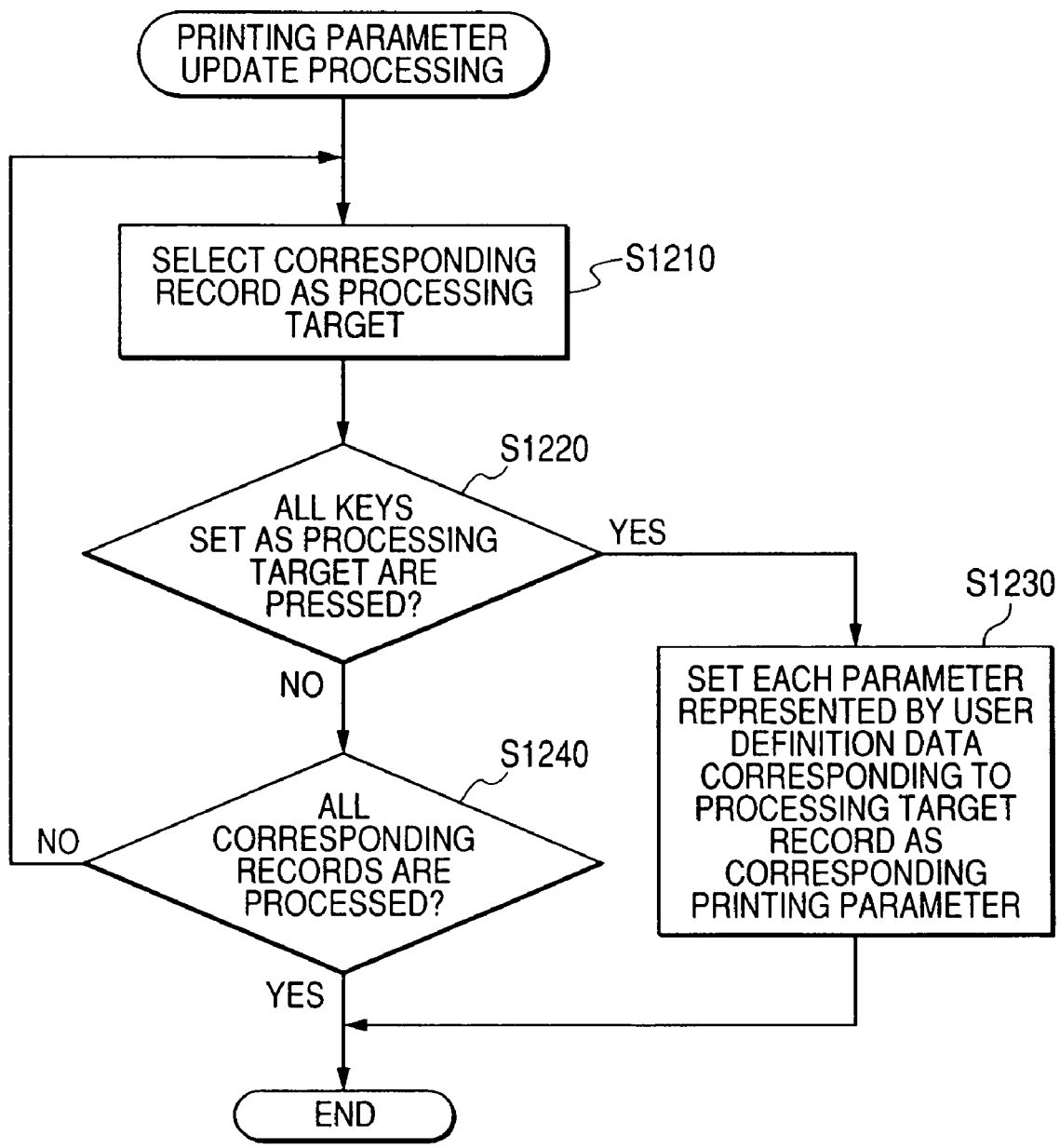

PRINTING CONTROL APPARATUS FOR ASSIGNING PARAMETER SELECTIONS TO SPECIFIC KEYS

CROSS REFERENCE TO RELATED APPLICATION

This application claims priority from Japanese Patent Application No. 2005-191958, filed Jun. 30, 2005, the contents of which are hereby incorporated by reference into the present application.

TECHNICAL FIELD

Aspects of the present invention relate to a printing control apparatus for printing data based on setup values of parameters for a printing mode and forming images based on the data using a printing mode according to the setup values, and a program thereof.

BACKGROUND

Conventionally, a printing control apparatus, in which a parameter for a printing mode can be changed by a user's instruction to execute a printing processing based on a setup value of the parameter, has been known. The parameter comprises a number of printing pages, a printing orientation and a number of pages per a paper (i.e. a layout). In addition, in such a printing control apparatus, a plurality of combinations of setup values for each parameter can be registered. One of the combinations of the registered setup values is selected by a user's instruction. Then, an image is printed by a printer through a printing mode corresponding to the selected combination of the setup values (See, for example, JP-A-8-185294.)

However, in order to change a parameter in the conventional apparatus, a user must use a keyboard or a pointing device to display a setup dialog and input an instruction to change a parameter through the setup dialog. Operation to change the setup parameter is cumbersome for a user.

In well-known application software such as a word processor, a one-click object for inputting a printing instruction is often displayed on a screen of a graphic user interface (GUI). However, in the conventional apparatus, although a printing can be instructed in a one-click manner through the object, the user cannot use the object for changing the setup parameter, because the user must use the setup dialog to change the setup parameter.

Aspects of the present invention provide a printing control apparatus, in which a desired printing process can be executed by a simple operation.

SUMMARY

According to an aspect of the present invention, a printing control apparatus comprises: a printing control unit that executes a printing processing for predetermined to-be-printed data based on a setup value of a parameter relating to a printing mode in response to inputting a printing instruction through an input unit comprising a plurality of operable keys, and enables a printer to form an image based on the to-be-printed data in the printing mode corresponding to the setup value; a determination unit that determines whether or not a particular key in the input unit is pressed in response to inputting the printing instruction based on an input signal from the input unit, the input signal being generated in response to pressing a key provided on the input unit; and a, setting unit that selects a parameter in the printing control unit based on a result of the determination unit before executing the printing processing, and sets a value of the parameter in the printing control unit.

According to another aspect of the present invention, a computer program product for enabling a computer to control printing comprises; software instructions for enabling the computer to perform predetermined operations, and a computer readable medium bearing the software instructions; the predetermined operations comprising the steps of: executing a printing processing for predetermined to-be-printed data based on a setup value of a parameter relating to a printing mode in response to inputting a printing instruction through an input unit comprising a plurality of operable keys, and enables a print to form an image based on the to-be-printed data in a printing mode corresponding to the setup value; determining whether or not a particular key in the input unit is pressed in response to inputting the printing instruction based on an input signal from the input unit, the input signal being generated in response to pressing a key provided on the input unit; and selecting a parameter in the printing control unit based on a result of the determination unit before executing the printing processing, and setting a value of the parameter in the printing control unit.

In the aforementioned printing control apparatus, the input unit may be hardware such as an input device comprising a plurality of keys such as a keyboard or a mouse. In addition, the determination unit may be configured to determine whether or not a particular key is pressed in response to inputting a printing instruction. Furthermore, the determination unit may be configured to determine degree of pressing of a particular key (in response to using an analog input unit capable of detecting a pressing intensity for a key), or configured to determine time of pressing a particular key before and after a printing instruction is input. Also, the particular key may be a single key or a combination of a plurality of keys (for example, the particular key may be determined to be pressed in response to pressing both a SHIFT key and a CTRL key).

BRIEF DESCRIPTION OF THE DRAWINGS

FIG. 2A illustrates printing setup data, and FIG. 2B illustrates user definition data according to the first illustrative aspect;

FIGS. 12A to 12C illustrate data in the hard disk drive 17 according to a third illustrative aspect;

FIG. 14A illustrates a user setup dialog according to the third illustrative aspect, and FIG. 14b illustrates an individual user setup dialog;

FIG. 17 is a flowchart illustrating a printing control processing executed by the CPU 11 according to the third illustrative aspect; and FIG. 18 is a flowchart illustrating a printing parameter update processing executed by the CPU 11 according to the third illustrative aspect.

DETAILED DESCRIPTION OF THE INVENTION

General Overview

Figure 1:
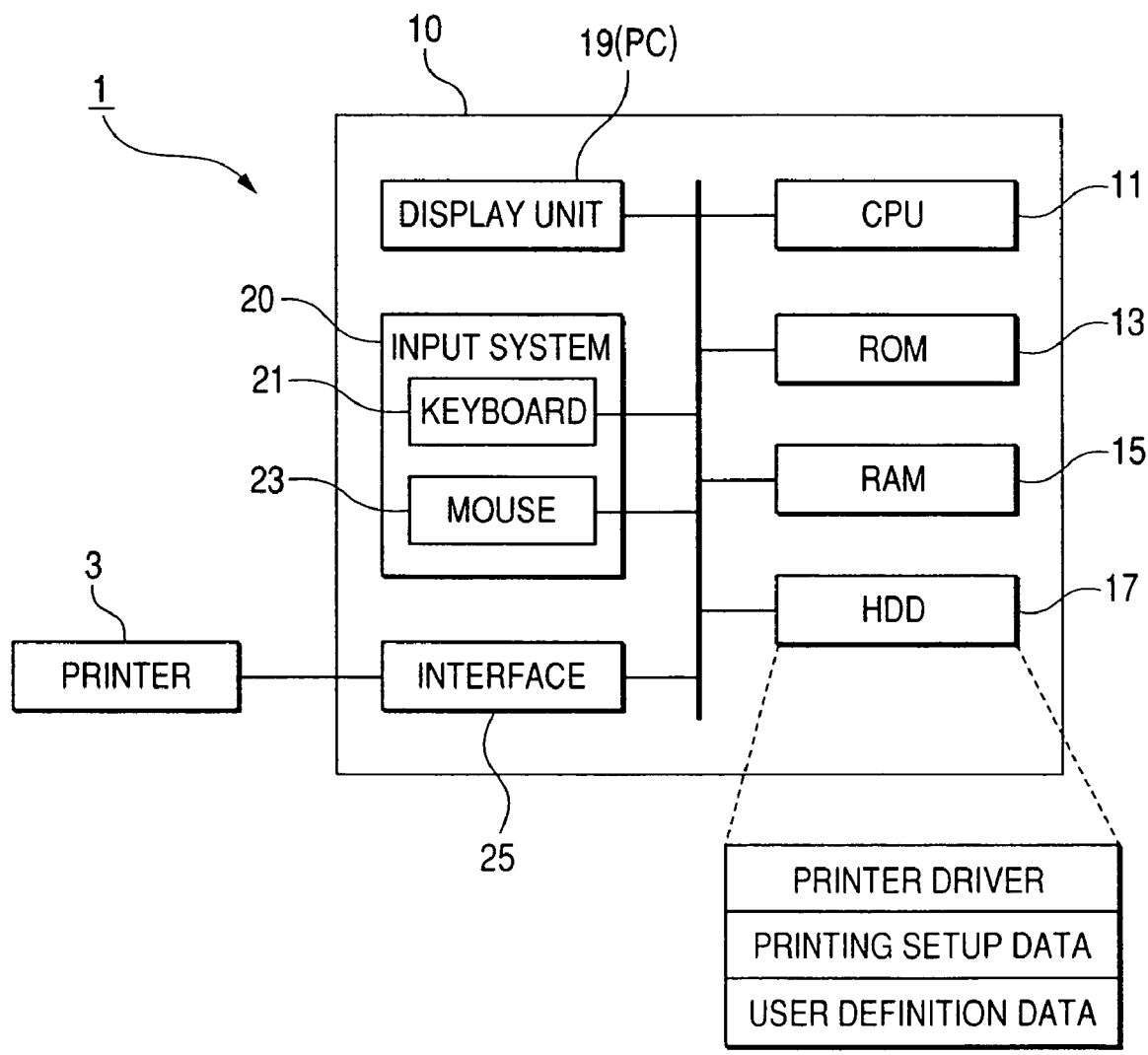
FIG. 1 illustrates a printing system 1 according to a first illustrative aspect.

In order to achieve the aforementioned object, a printing control device according to claim 1 of the present invention includes a printing unit executing a printing processing for predetermined to-be-printed data based on a setup value of a parameter relating to a printing method in response to inputting a printing instruction from a user through an input system having a plurality of keys that can be manipulated by a user, and forming an image based on the to-be-printed data using a printing method corresponding to the setup value on a printer. In addition, the printing control apparatus includes a determination unit determining whether or not a particular key in the input system is pressed in response to inputting the printing instruction based on an input signal generated by pressing a key provided on the input system and input from the input system. In addition, the printing control apparatus includes a setting unit determining a parameter set is for the printing control unit based on a result of the determination unit before the printing processing is executed, and setting the parameter for the printing control unit based on the result of the determination of the parameter.

According to the printing control apparatus, the setting unit changes the parameter to be set depending on whether or not a particular key is pressed. Therefore, a user does not need to open the setup dialog unlike the conventional printing control apparatus. Also, a printing method can be changed by only changing the manipulation of a particular key in response to performing an input operation. Consequently, according to the present invention, a user can execute a printing processing on a printing control apparatus using a desired parameter by a simple manipulation.

In the aforementioned printing control apparatus, the input system may be hardware such as an input device having a plurality of keys such as a keyboard or a mouse. In addition, the determination unit may be configured to determine whether or not a particular key is pressed in response to inputting a printing instruction. Furthermore, the determination unit may be configured to determine degree of pressing of a particular key (in response to using an analog input system capable of detecting a pressing intensity for a key), or configured to determine time of pressing a particular key before and after a printing instruction is input. Also, the particular key may be a single key or a combination of a plurality of keys (for example, the particular key may be determined to be pressed in response to pressing both a SHIFT key and a CTRL key).

In the aforementioned printing control apparatus, the value of the change parameter may be predetermined in a product design stage. Preferably, the printing control apparatus may be configured as described in claim 2.

The printing control apparatus according to claim 2 includes a storage device for storing user definition data representing a parameter for the printing method; and an update unit updating the user definition data stored in the storage device to user definition data representing a value designated by a user based on an input signal from the input system, wherein the setting unit is configured to select a predetermined default value or the value of the user definition data stored in the storage device as a parameter to be set for the printing control unit depending on a result of the determination of the determination unit.

According to the printing control apparatus of claim 2, a user can execute a desired printing processing on a printing control apparatus using a particular key by changing the parameter maintained in the user definition data through the update unit. Therefore, it is possible to improve freedom of changing a printing method.

The printing control apparatus may be configured to set the value represented by the user definition data for the printing control unit in response to determining that the particular key is not pressed in response to inputting a printing instruction, and set a default value for the printing control unit in response to pressing the particular key in response to inputting a printing instruction. Also, the printing control apparatus may be configured as described in claim 3.

In the printing control apparatus according to claim 3, the setting unit may be configured to select the default value as the parameter to be set for the printing control unit in response to determining that the particular key is not pressed, or to select the value represented by the user definition data as the parameter to be set for the printing control unit in response to determining that the particular key is pressed. As a result, a user can set a desired value set in the user definition data for the printing control unit by pressing the particular key in response to inputting a printing instruction. Therefore, a user can execute a desired printing processing on a printing control apparatus by pressing a particular key in response to inputting a printing instruction.

In addition, the aforementioned printing control apparatus may be configured to allow the user definition data to have a plurality of values for all the parameters to be set by the setting unit when there are a plurality of parameters for the printing method to be set by the setting unit, or to have a value for a part of the plurality of parameters to be set by the setting unit. In addition, what kind of parameter should be registered in the user definition data may be determined by a user or a product designer.

In addition, the printing control apparatus may be configured as described in claim 4 when there are a plurality of parameters for the printing method to be set by the setting unit. In the printing control apparatus of claim 4, the setting unit is configured to select the default value as the parameter to be set for the printing control unit if the parameter does not belong to the user definition data, and to select the default value or the value represented by the user definition data as the parameter to be set for the printing control unit based on the determination result of the determination unit if the parameter belongs to the user definition data.

When the parameter does not belong to the user definition data, the setting unit may select the default value as the parameter to be set for the printing control unit in response to determining that the particular key is not pressed, or select the value represented by the user definition data as the parameter to be set for the printing control unit in response to determining that the particular key is pressed. Otherwise, the setting unit may select the default value as the parameter to be set for the printing control unit in response to determining that the particular key is pressed, or select the value represented by the user definition data as the parameter to be set for the printing control unit in response to determining that the particular key is not pressed.

According to the present invention, it is not necessary to define all combinations of parameters for the user definition data. Therefore, it is possible to simplify the configuration of the user definition data when the printing control apparatus is configured to execute the change operation for a part of parameters based on a particular key. This would provide user's convenience.

In addition, although the aforementioned printing control apparatus may be configured to set all the parameters represented by the user definition data in the printing control unit in response to pressing the particular key, it may be preferably configured to determine whether the value represented by the user definition data or the default value is set for each parameter.

In the printing control apparatus of claim 5, an individual key is allocated to each parameter belonging to the user definition data as the particular key, the determination unit determines, for each particular key set for each parameter, whether or not the particular key is pressed in response to inputting the printing instruction, and the setting unit is configured to select the value represented by the user definition data as the parameter to be set for the printing control unit in response to determining that the particular key corresponding to the user definition data is pressed, or to select the default value as the parameter to be set for the printing control unit in response to determining that the particular key corresponding to the user definition data is not pressed.

According to the printing control apparatus of claim 5, a user can allow a desired printing processing to be executed on a control device with a high level of freedom by manipulating (i.e., pressing or not pressing) the key corresponding to each parameter.

In the printing control apparatus of claim 6, the storage device has key definition data representing a parameter setup key based on the user definition data, the update unit is configured to update the parameter setup key represented by the key definition data to a key designated by a user based on the input signal from the input system, and the determination unit determines whether or not the parameter setup key represented by the key definition data as the particular key is pressed in response to inputting the printing instruction.

According to the printing control apparatus of claim 6, a user can allow a desired printing processing to be executed on the printing control apparatus with easy manipulation by is setting a key, which is easy to manipulate for a user, in the key definition data. Therefore, it is possible to improve convenience of manipulation relating to pressing of a key.

In response to registering a plurality of parameters in the user definition data, the printing control apparatus may be configured to allow a user to set an arbitrary key as a particular key for each parameter, thereby improving user's convenience.

In the printing control apparatus of claim 7, the storage device has key definition data including an identification code of a parameter setup key based on the user definition data for each parameter belonging to the user definition data, and the update unit is configured to individually update each identification code of each key belonging to the key definition data to an identification code of a key designated by a user based on the input signal from the input system. Also, the determination unit determines whether or not each key registered in the key definition data as the particular key in the shape of the identification code is pressed in response to inputting the printing instruction, and the setting unit is configured to select the value represented by the user definition data as the parameter to be set for the printing control unit in response to determining that the particular key corresponding to the user definition data is pressed, or to select the default value as the parameter to be set for the printing control unit in response to determining that the particular key corresponding to the user definition data is not pressed.

According to the printing control apparatus of claim 7, a user can allow the printing control apparatus to execute a desired printing processing with convenient manipulation by setting a key which is easy to manipulate for a user in the key definition data. Similar to the printing control apparatus of claim 6, it is possible to improve user's convenience relating to pressing of a key.

The aforementioned printing control apparatus may be configured as described in claim 8. The printing control apparatus of 8 includes a dialog display unit displaying a dialog, capable of receiving a change instruction for changing the default value of the parameter to be set by the setting unit, on a display unit based on a user's instruction input through the input system; and a default value change unit changing the default value of the parameter to be set by the setting unit based on the change instruction received from the dialog, the change instruction being generated by manipulating the dialog by a user through the input system.

The dialog may have an object for displaying a user setup dialog capable of receiving an instruction for updating the user definition data, and the printing control apparatus further includes a user setup dialog display unit displaying the user setup dialog on the display unit in response to the manipulation of the object through the input system. In addition, the update unit is configured to update the user definition data stored in the storage device as user definition data representing a value designated by a user depending on the instruction for updating the user definition data, obtained from the user setup dialog, by manipulating the user setup dialog through the input system.

According to the printing control apparatus of claim 8, a user can manipulate setting of the default value as well as the user definition data through the user setup dialog. Therefore, a user can manipulate the setting while an aspect of changing the parameter in both the cases where a particular key is used and not use is imaged. As a result, it is possible to improve convenience of manipulation in response to setting the user definition data.

Furthermore, the aforementioned printing control apparatus may be configured as described in claim 9. In addition to the dialog display unit and the default change unit, the printing control apparatus of claim 9 may be configured to allow the dialog displayed on the dialog display unit to have an object for displaying a user setup dialog capable of receiving an instruction for updating the key definition data. The printing control apparatus may further include a user setup dialog display unit displaying the user setup dialog on the is display unit in response to manipulating the object through the input system, and the update unit may be configured to update the key definition data stored in the storage device as key definition data representing a key designated by a user depending on the instruction for updating the key definition data, obtained from the user setup dialog, by manipulating the user setup dialog through the input system.

According to the printing control apparatus of claim 9, a user can manipulate setting of the default value as well as the user definition data through the user setup dialog. Therefore, a user can manipulate the setting while the manipulation for changing the parameter using a particular key is imaged. As a result, it is possible to improve convenience of manipulation in response to setting the key definition data.

Although, in the above descriptions, an individual key may be set for each parameter as a particular key in response to registering a plurality of parameters in the user definition data, the similar concept may be applied in response to storing a plurality of pieces of user definition data in the storage device. In other words, the printing control apparatus may be configured in such a way that an individual key is allocated to each user definition data, and the parameter is set by changing the referenced user definition data depending on which key is pressed.

The printing control apparatus of claim 10 further includes, in addition to the printing control apparatus of claim 1, a registration unit generating user definition data representing a parameter relating to the printing method based on the input signal from the input system, and registering the user definition data in a storage device, as well as registering an identification code of a parameter setup key based on the user definition data in the storage device in relation with the registered user definition data.

The determination unit determines whether or not the key registered in the storage device as the particular key in the shape of the identification code is pressed in response to inputting the printing instruction. The setting unit is configured to select a predetermined default value as the parameter to be set for the printing control unit in response to determining that the particular key is not pressed, or to select the parameter represented by the user definition data as the parameter to be set for the printing control unit based on the user definition data stored in the storage device in relation with the identification code of the particular key in response to determining that the particular key is pressed.

According to the printing control apparatus of claim 10, a user can allow the printing control unit to execute a printing processing using a default value, by changing the manipulation of a particular key (e.g., pressing or not pressing) in response to inputting the printing instruction, without opening a dialog.

In addition, when there are a plurality of parameters relating to a printing method to be set by the setting unit, the user definition data may be configured to have values for all of a plurality of parameters to be set by the setting unit or a value for a part of a plurality of parameters to be set by the setting unit.

In addition, the functions of each unit provided in the aforementioned printing control apparatus may be implemented by a program in a computer. A program of claim 11 is a program executed on a computer for implementing a printing control process executing a printing processing for predetermined to-be-printed data based on a setup value of a parameter relating to a printing method in response to inputting a printing instruction from a user through an input system having a plurality of keys that can be manipulated by a user, and forming an image based on the to-be-printed data, using a printing method corresponding to the setup value on a printer, a determination process determining whether or not a particular key in the input system is pressed in response to inputting the printing instruction based on an input signal generated by pressing a key provided on the input system and input from the input system, and a setting process determining the parameter to be set, based on a result of the determination process, before the printing processing is executed, and setting the parameter based on the result of the determination of the parameter.

Illustrative aspects of the present invention will now be described in detail with reference to the accompanying drawings.

(Illustrative Aspect 1)

FIG. 1 illustrates a printing system 1 according to a first illustrative aspect of the present invention. The printing system 1 according to the present illustrative aspect comprises a printer 3, and a personal computer (PC) 10 communicatably connected to the printer 3. In the printing system 1, the printer 3 receives a control signal from the PC 10 to form (i.e., print) an image on a paper.

The PC 10 comprises a central processing unit (CPU) 11 for executing various programs, a ROM 13 for storing a boot program and the like executed by the CPU 11, a RAM 15 used as a working area in response to executing the program by the CPU 11, a hard disk drive 17 for storing various data and programs comprising an operating system (OS) or application programs such as a word processor, a display unit 19 comprising a liquid crystal monitor and the like, an input unit 20 such as a key board 21 or a pointing device (i.e., a mouse 23) that can be operated by a user, and an interface 25 such as an universal serial bus (USB) interface that can be communicated with the printer 3.

In addition, the PC 10 according to the present illustrative aspect stores, in the hard disk drive 17, a printer driver program for controlling the printer 3, printing setup data in which parameters (i.e., default values) used in the printing process are described, and user definition data used in response to changing the parameters.

FIG. 2A illustrates printing setup data, and FIG. 2B illustrates user definition data.

As shown in FIG. 2A, the printing setup data comprises a setup ID representing an identification code for each parameter used in the printing process and a registration value representing a value registered as a value to be set up for the parameter. For example, the printing setup data may comprise a parameter for determining the number of pages per a paper (i.e. a layout) or a parameter for a sheet medium as a parameter for a printing mode.

In the user definition data, an item number, a title of a setup item, a setup ID representing an identification code of the parameter, a registration value registered as a value to be set up for the parameter, and a key setup value representing an identification code of the key are described for each predetermined parameter comprised as a part of a plurality of parameters registered in the printing setup data.

For example, in the user definition data shown in FIG. 2B, the parameter of "the number of pages per a paper (i.e., a layout)" is designated as "2", and the key setup value is designated as an identification code of a SHIFT key.

In the present illustrative aspect, in response to registering the aforementioned value in the user definition data, and in response to pressing the SHIFT key in response to inputting a printing instruction, the parameter of "the number of pages per a paper (i.e., a layout)" is changed from the value registered in the printing setup data (e.g., "1")) to the value registered in the user definition data (e.g., "2"). Then, a printing processing is executed based on this value.

Figure 3:
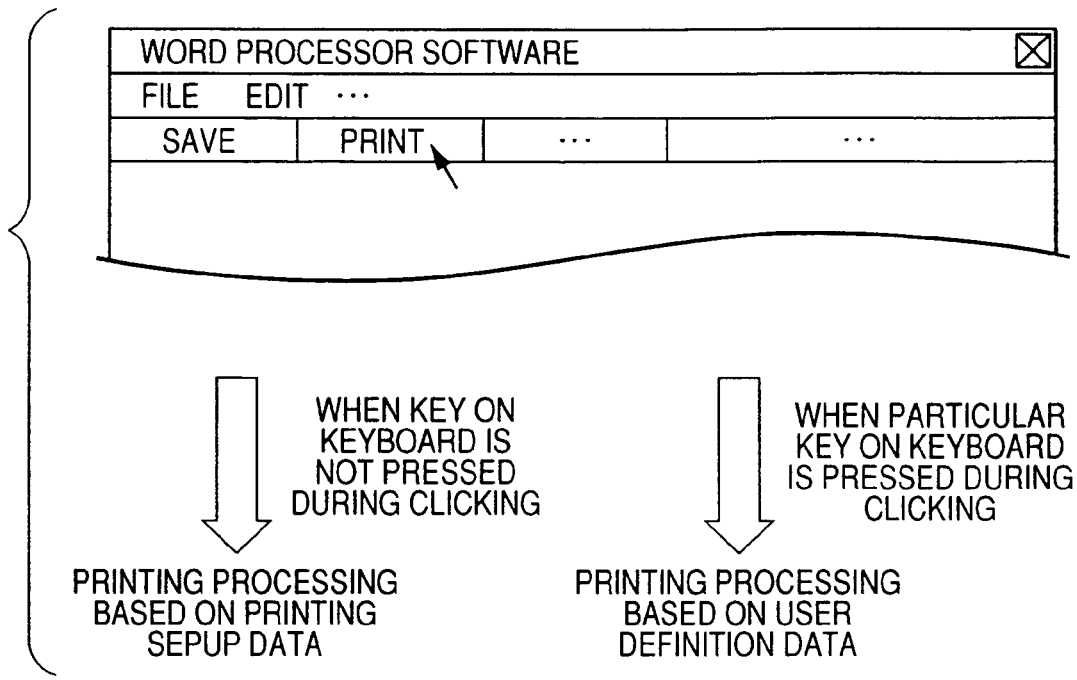
FIG. 3 illustrates an aspect of operation of the PC 10.

FIG. 3 schematically illustrates an aspect of the operation of the PC 10 operating in the aforementioned manner. The PC 10, operated as a multi-window system, displays an object (i.e., a printing key) for inputting a printing instruction on an application window as a GUI. In the PC 10 of the present illustrative aspect, in response to registering a particular key registered with an identification code in the user definition data in response to clicking a printing key through a mouse 23 in response to creating data by a word processor or the like, the corresponding parameter is changed from the value represented by the printing setup data to the value of the user definition data. Meanwhile, in response to not pressing the particular key registered in the user definition data in response to clicking the printing key, the PC of the present illustrative aspect executes the printing process based on the value registered in the printing setup data like a conventional method.

The PC 10 of the present illustrative aspect is capable of displaying a user setup dialog as a GUI capable of receiving an instruction for updating each parameter described in the user definition data from a user. The user setup dialog is displayed by clicking a user setup key provided on a printing setup dialog as a GUI capable of receiving an instruction for updating each parameter described in the printing setup data from a user through a mouse 23.

Figure 4:
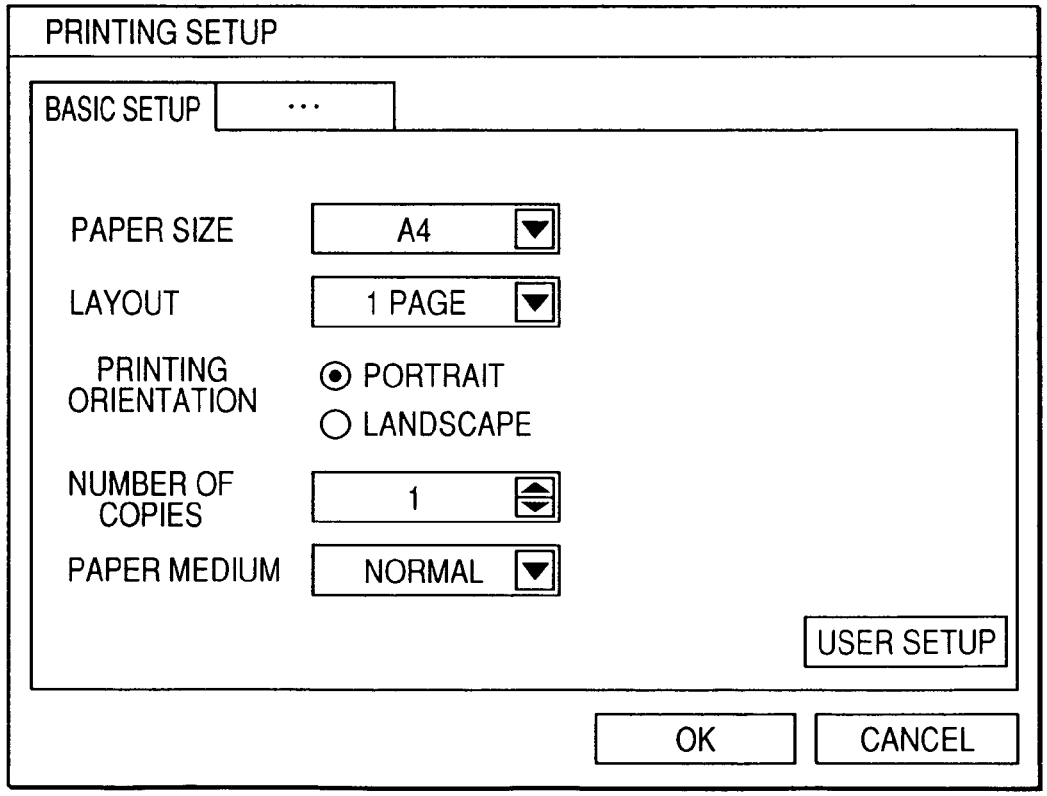
FIG. 4 illustrates a printing setup dialog according to the first illustrative aspect.

FIG. 4 illustrates a printing setup dialog comprising a user setup key. Also, FIG. 5A illustrates a user setup dialog displayed by clicking the user setup key, and FIG. 5B illustrates a screen displayed in response to clicking a pull-down type object for a "Layout".

Figure 5A:
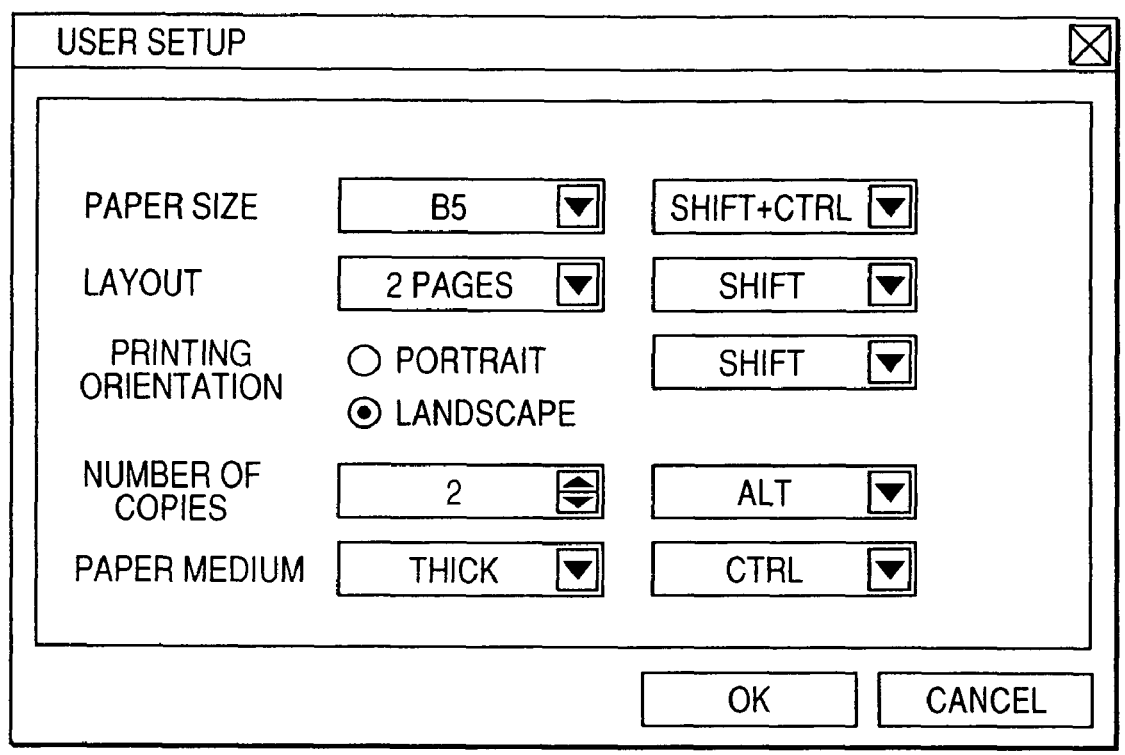
FIGS. 5A and 5B illustrate a user setup dialog according to the first illustrative aspect.
Figure 5B:
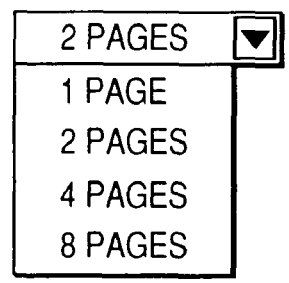

As shown in FIG. 5A, the user setup dialog of the present illustrative aspect comprises an object (such as a pull-down type input field) for registering the setup value for each predetermined parameter to be changed, and an object (such as a pull-down type input field) for registering the key setup value. In response to using the user setup dialog, a list of selection items is displayed as shown in FIG. 5B by clicking an object through a mouse 23, and a desired value is selected from a list of the selection items, so that a certain value can be registered in the user definition data.

Figure 6:
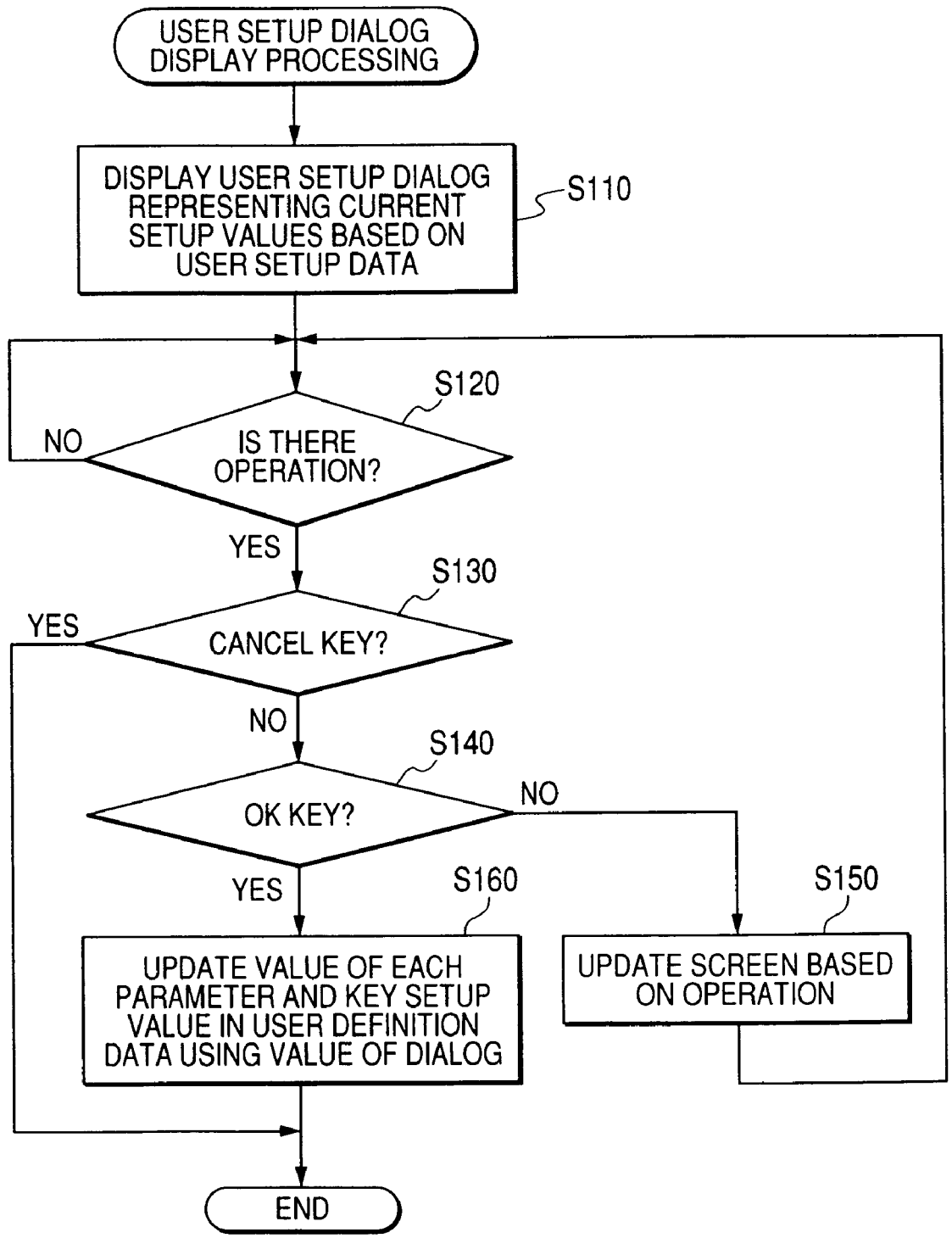
FIG. 6 is a flowchart illustrating a user setup dialog display processing executed by the CPU 11 according to the first illustrative aspect.

In response to clicking the user setup key, the PC 10 of the present illustrative aspect executes a user setup dialog display processing as shown in FIG. 6 based on a printer driver program, so that the update instruction is received from a user through a user setup dialog, and user definition data is updated. FIG. 6 is a flowchart illustrating a user setup dialog display processing executed by the CPU 11 in response to clicking the user setup key.

In response to initiating a user setup dialog processing, the CPU 11 reads the user definition data from the hard disk drive 17 and allows the display unit 19 to display the user setup dialog showing a current setup value based on the user definition data (S110). That is, in the step S110, the CPU 11 executes a process for displaying each parameter represented by the user definition data to a user through the user setup dialog.

After the step S110, the CPU 11 waits for user's input until a user inputs operation information through the input unit 20 such as a keyboard 21 or a mouse 23 (S120). In response to inputting the operation information from the input unit ("YES" in the step S120), it is determined whether or not the operation created by a user is a clicking of a CANCEL key provided on the user setup dialog based the operation information (S130). Subsequently, in response to determining that the user's operation is the clicking of a CANCEL key ("YES" in the step S130), the user setup dialog is closed, and the user definition dialog display processing is terminated.

In response to determining that the operation from a user is not the clicking of a CANCEL key ("No" in the step S130), the process proceeds to the step 140, so that the CPU 11 determines whether or not the user's operation is a clicking of an OK key provided on the user setup dialog. Subsequently, in response to determining that the user's operation is not the clicking of an OK key ("No" in the step 140), a processing corresponding to the user's operation is executed (S150).

For example, in the step S150, the CPU 11 executes a process for updating the values displayed on each object based on a user's instruction. In other words, in response to clicking an object, the CPU 11 allows a list of selection items corresponding to the clicked parameter to be displayed as shown in FIG. 5B. Then, in response to selecting one of the items by a user's clicking, the list is closed, and the value of the selected item is displayed on a pull-down type object. Similarly, in response to clicking an object for registering a key setup value, a list of selectable keys is displayed, and a key selected by a user is displayed. After the step S150, the process proceeds to the step S120, and the CPU 11 waits for the next operation.

In response to determining that the user's operation is a clicking of an OK key ("Yes" in the step S140), the process proceeds to the step S160, and the CPU 11 updates the key setup value and the registration value of each parameter in the user definition data using the value set in the user setup dialog (i.e., the value displayed on the dialog). Then, the user setup dialog is closed, and the user setup dialog display processing is terminated.

Figure 7:
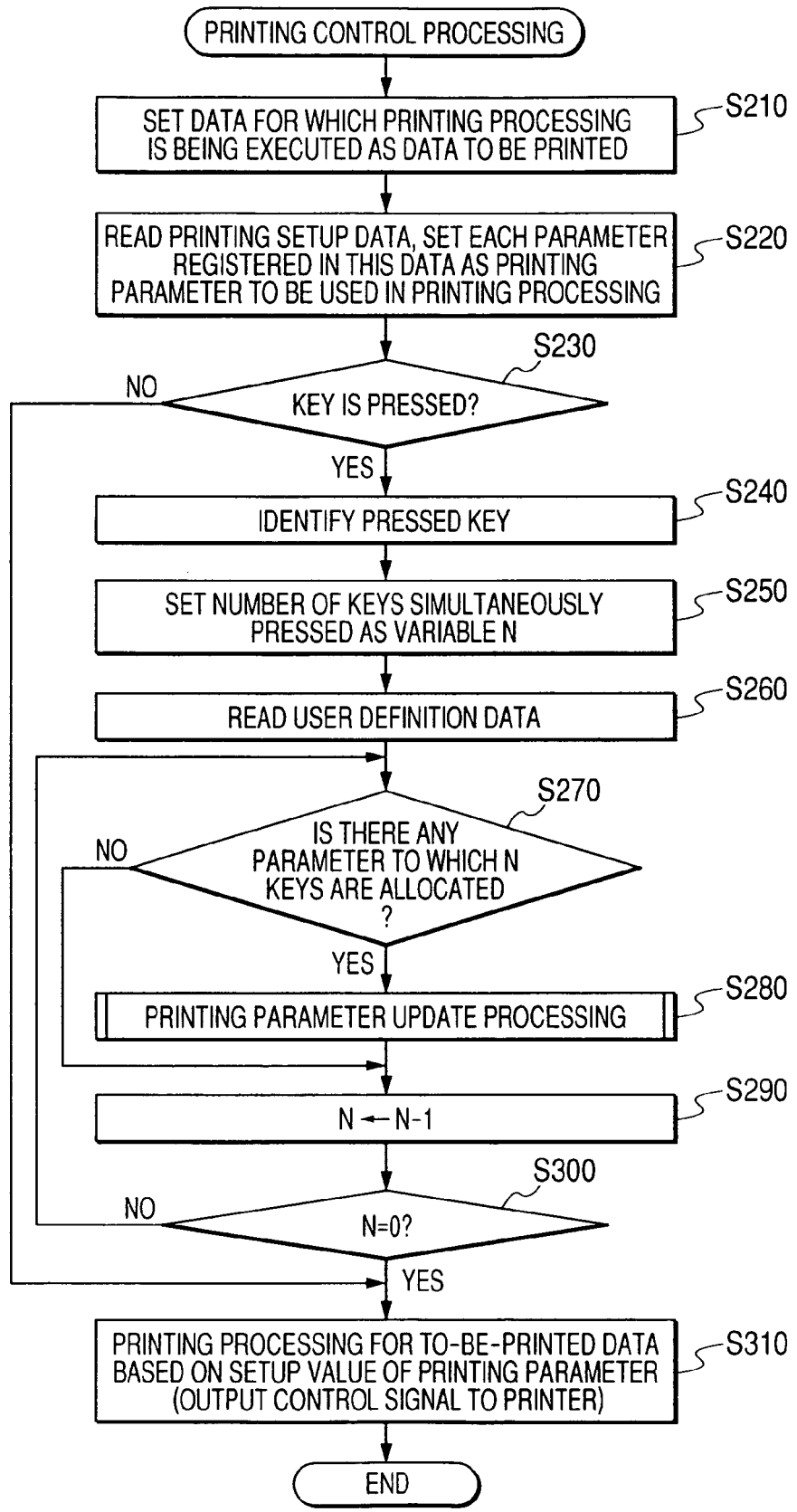
FIG. 7 is a flowchart illustrating a printing control processing executed by the CPU 11 according to the first illustrative aspect.

FIG. 7 is a flowchart illustrating a printing control process executed by the CPU 11 based on the printer driver program in response to inputting a printing instruction from a user through the input unit 20, for example, by clicking a printing key as described above.

In response to initiating the printing control processing, the CPU 11 sets, as to-be-printed data, user data (such as a document created by a user) to be displayed by a task (such as a task of a word processor) that has received the printing instruction in the step S210. In addition, after this processing is terminated, the CPU 11 reads the printing setup data maintained in the hard disk drive 17, and sets each parameter represented by this printing setup data to a printing parameter for determining operation in a printing process in the step S220.

In response to terminating this processing, the CPU 11 determines whether or not there is a key pressed in response to inputting the printing instruction, in the keyboard 21, based on the input signal obtained from the keyboard 21 in response to inputting the printing instruction (S230). Then, in response to determining that there is no pressed key ("No" in the step 230), the process proceeds to the step S310, so that a printing processing for the to-be-printed data is executed based on each printing parameter, that is being currently set, to output a control signal for printing an image based on the to-be-printed data to the printer 3 through an interface 25 using a printing mode represented by the printing parameter.

For example, in response to setting the printing parameter of "the number of pages per a paper (i.e., a layout)" to "1", image data for forming an image of one page per a paper is created by a printing processing, and the image data is input to the printer 3. Then, the printing control processing is terminated.

In response to determining that there is the pressed key ("YES" in the step S230), the CPU 11 identifies the pressed key in response to inputting the printing instruction (S240) and sets the number of the pressed keys as a variable N (where, N is a natural number) (S250). Subsequently, the CPU 11 reads the user definition data maintained in the hard disk drive 17 (S260) and determines whether or not there is a parameter where identification codes of N keys are registered as a key setup value in the user definition data (S270). In response to determining that there is a parameter where the identification codes of N keys are registered ("YES" in the step S270), the process proceeds to the step S280, so that a printing parameter update processing is executed as shown in FIG. 8.

Figure 8:
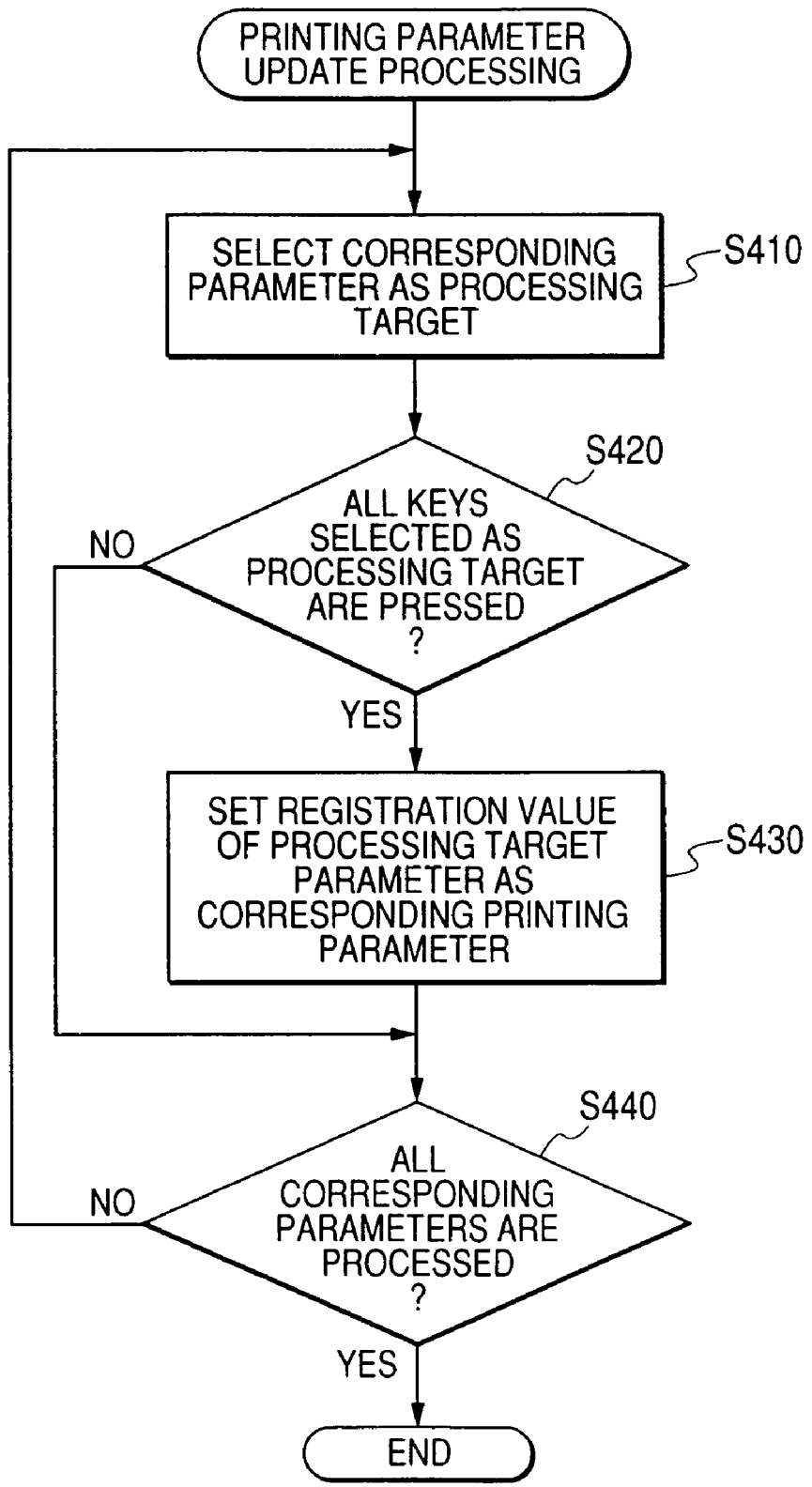
FIG. 8 is a flowchart illustrating a printing parameter update processing executed by the CPU 11 according to the first illustrative aspect.

FIG. 8 is a flowchart illustrating a printing parameter update processing executed by the CPU 11. In response to initiating the printing parameter update processing, the CPU 11 selects the corresponding parameter (i.e., the parameter where identification codes of N keys are registered) in the user definition data as one processing target (S410). Then, it is determining whether or not all the keys represented by the key setup value for the selected processing target parameter correspond to the keys that are pressed in response to inputting the printing instruction (S420). Subsequently, in response to determining that all the keys correspond to the pressed keys ("YES" in the step S420), the registration value of the processing target parameter represented by the user definition data is set to the corresponding printing parameter (S430). Then, the process proceeds to the step S440.

In response to determining that the at least one of the keys represented by the key setup value of the processing target parameter does not correspond to the keys that are pressed in response to inputting the printing instruction in the step S420 ("NO" in the step S420), the process skips the step 430, and proceeds to the step S440.

In the step S440, the CPU 11 determines whether or not the processes followed by the step 420 are executed for all the corresponding parameters in the user definition data (the parameters where identification codes of N keys are registered). In response to determining that the processes followed by the step S420 are not executed ("No" in the step S440), the process proceeds to the step S410, so that the processes followed by the step S420 are executed by selecting the parameter that has not been processed as a processing target. In response to determining that, in the step S440, the processes followed by the step S420 are executed for all the corresponding parameters, the printing parameter update processing is terminated.

In response to terminating the printing parameter update processing in the step S280, the process proceeds to the step S290, so that the CPU 11 subtracts 1 from the variable N. Then, the process proceeds to the step S300, so that it is determined whether or not N is zero (N=0). When N≠0, the process proceeds to the step S270. In the step S270, it is determined whether or not there is a parameter, where identification codes of the keys having its number corresponding with the variable after the subtraction (N−1) are registered, in the user definition data (S270). In response to determining that there is this parameter ("YES" in the step S270), the printing parameter update processing for that parameter is executed (S280), and then, the variable N is subtracted by 1 (S290).

In response to determining that N=0 ("YES" in the step S300), the process proceeds to the step S310, so that the CPU 11 executes a printing processing for the printing target data based on the setup value of each printing parameter that was updated by the printing parameter update processing. A control signal for printing the image based on the printing target data on a paper using a printing mode represented by the aforementioned printing parameter is output to the printer 3 through an interface 25.

For example, in response to setting the value "2" represented in the user definition data in the printing parameter of "the number of pages per a paper (a layout)" through the printing parameter update processing, image data for forming images of two pages per one paper is created by the printing processing, and this image data is output to the printer 3. Then, the printing control processing is terminated.

The printing system 1 according to the first illustrative aspect has been described. According to the first illustrative aspect, the PC 10 executes a printing processing for the printing target data based on the setup value of the parameter for the printing mode in response to inputting a user's instruction from a user through an input unit 20, and forms an image based on the printing target data using a printing mode corresponding to the setup value of the printing parameter on a printer (S310).

It is determined whether or not a particular key (e.g., a key registered in the user definition data) provided on a keyboard 21 is pressed in response to inputting the printing instruction based on the input signal created by pressing the keys provided on a keyboard 21 from the input unit 20 (S240 to S300, S410, and S420).

It is determined whether the value of the printing setup data initially set in the step 220 is maintained without change or should be changed to the value represented in the user definition data based on the result of determination in the step S420. In response to determining "YES" in the step S420, the value represented in the user definition data is set to the printing parameter in the step S430.

As described above, in the printing system 1 according to the present illustrative aspect, a typical printing processing is executed based on the printing setup data in response to not pressing a previously registered particular key in response to inputting the printing instruction. In response to pressing the particular key, the printing processing is executed by changing the printing parameter corresponding to the pressed key to the value represented in the user definition data. Therefore, in the printing system 1 according to the present illustrative aspect, a user can change the printing parameter by a simple operation such as is pressing a particular key in response to inputting the printing instruction, so that the PC 10 is allowed to execute a desired printing processing.

The PC 10 according to the present illustrative aspect receives an update instruction for each parameter registered in the user definition data using a user setup dialog, and individually updates each parameter registered in the user definition data to the value designated by a user using the user setup dialog (S160).

In the printing system 1 according to the present illustrative aspect, a user can set the printing parameter to a certain value by a simple operation such as pressing a particular key without changing the setup value provided on the setup dialog, so that the PC 10 is allowed to execute the printing processing.

According to the present illustrative aspect, the key setup value is maintained for each parameter using the user definition data, and an update instruction of the key setup value is received for each parameter registered in the user definition data using the user setup dialog. Therefore, each key setup value registered in the user definition data can be individually updated to the value designated by a user through the user setup dialog.

In the printing system 1 according to the present illustrative aspect, a user can allocate an individual key to each parameter as desired, so that a user can change the printing parameter by pressing a particular key provided on a key board 21 as necessary without forgetting the correspondence between the parameter and the key. In addition, a user can conveniently set a key for each parameter depending on how frequently a key is used. Therefore, according to the aspect of the invention, a user can change the printing parameter by a simple operation.

In the printing system 1 according to the present illustrative aspect, a user can allocate an individual key for each parameter. Therefore, a user can selectively change only a particular parameter from the default value by pressing the corresponding key.

According to the first illustrative aspect, although in the printer driver program each parameter can be changed on a single screen of the user setup dialog, the user setup dialog can be individually displayed for each parameter (as will be described below in a second illustrative aspect).

(Illustrative Aspect 2)

A printing system 1 according to a second illustrative aspect differs from the first aspect in the method of displaying the user setup dialog of the printing system 1. Therefore, only components different from those of the printing system according to the first illustrative aspect will be described selectively.

Figure 9:
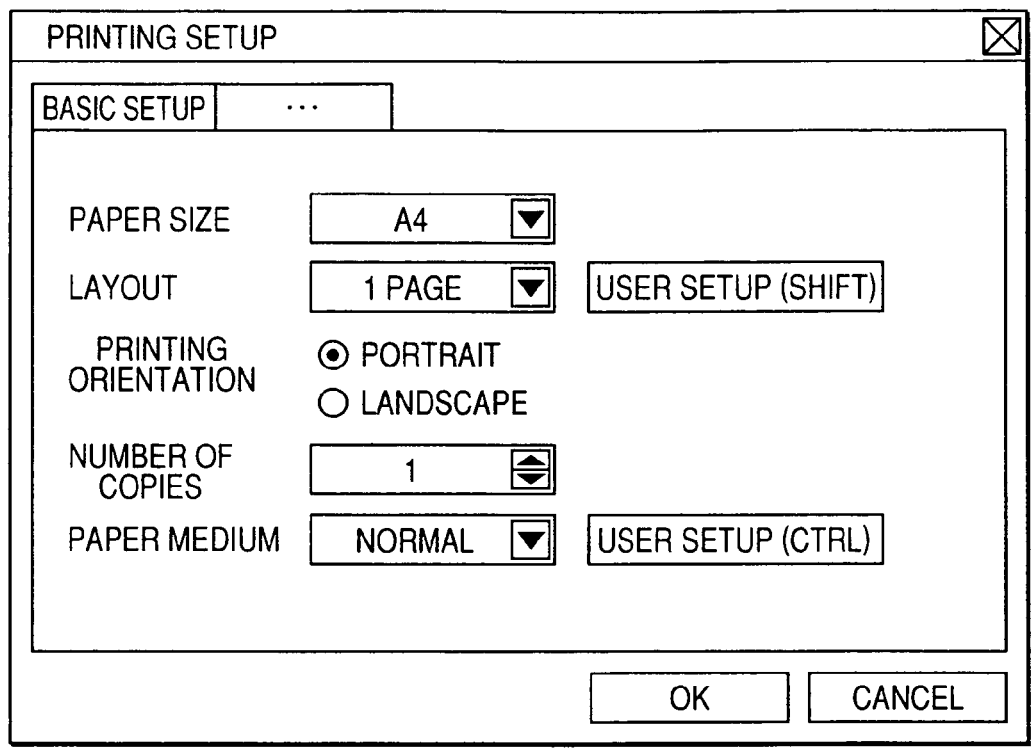
FIG. 9 illustrates a printing setup dialog according to a second illustrative aspect.

FIG. 9 illustrates a printing setup dialog according to the second illustrative aspect. As shown in FIG. 9, the printing setup dialog according to the second illustrative aspect comprises an individual user setup key corresponding to each parameter registered in the user definition data. In the printing setup dialog, each user setup key is adjacent to an object for receiving an instruction for changing the default value of the corresponding parameter from a user. Also, in the printing setup dialog shown in FIG. 9, the parameter of "the number of pages per a paper (a layout) " and the parameter of "a sheet medium" are registered in the user definition data.

Each user setup key is an object for displaying the user setup dialog, capable of receiving the update instruction for the key setup value and the registration value of the corresponding parameter in the user definition data from a user, on a display unit 19 depending on a user's instruction. The CPU 11 allows the user setup dialog for the parameter corresponding to the clicked user setup key to be displayed on the display unit 19 in response to clicking the user setup key through a mouse 23.

Figure 10A:
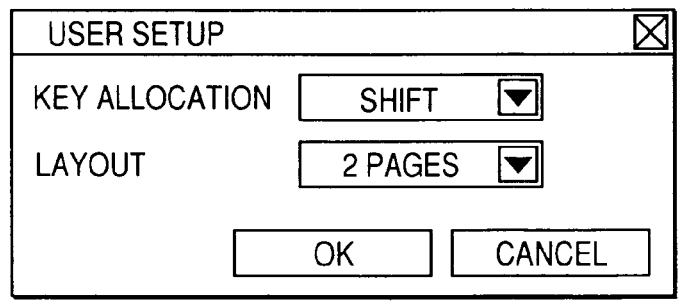
FIGS. 10A and 10B illustrate a user setup dialog according to the second illustrative aspect.
Figure 10B:
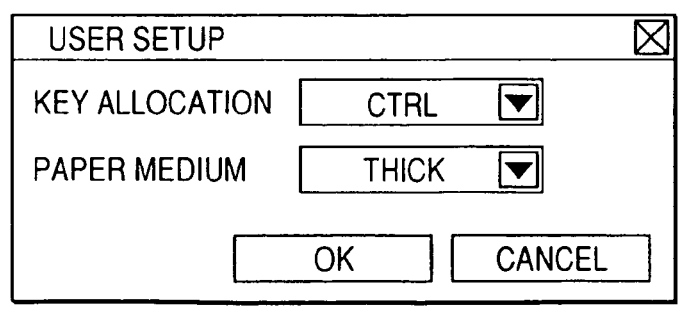

FIGS. 10A and 10B illustrate the user setup dialog according to the second illustrative aspect. Specifically, FIG. 10A shows a user setup dialog for "the number of pages per a paper (a layout), and FIG. 10B shows a user setup dialog for "a sheet medium". Each user setup dialog according to the is second illustrative aspect comprises an object for receiving an instruction for changing the registration value of the corresponding parameter and an object for receiving an instruction for changing the key setup value of the corresponding parameter.

Figure 11:
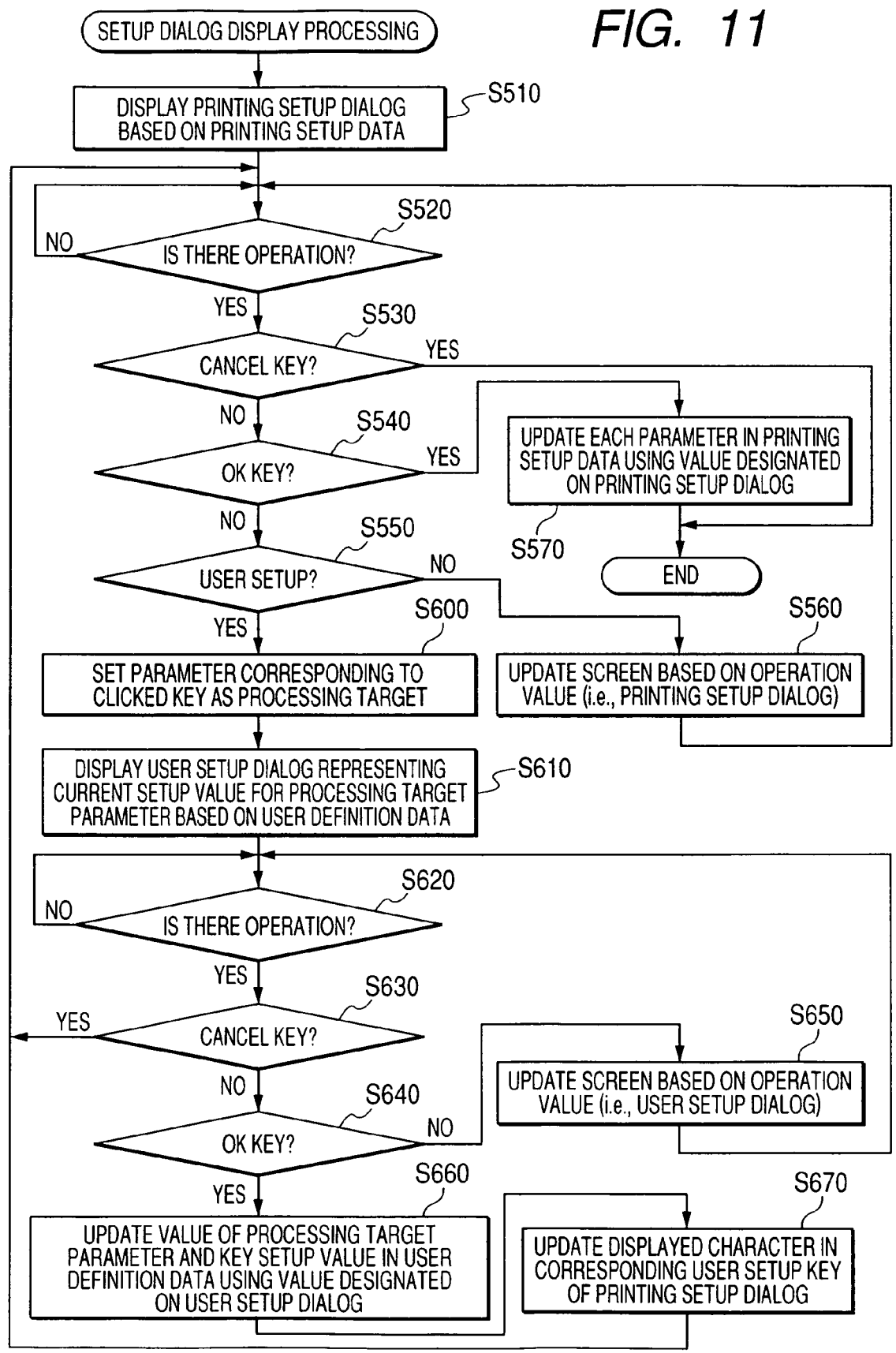
FIG. 11 is a flowchart illustrating a setup dialog display processing executed by the CPU 11 according to the second illustrative aspect.

FIG. 11 is a flowchart illustrating a setup dialog display processing executed by the CPU 11 based on the printer driver program in response to inputting an instruction for displaying the printing setup dialog through the input unit 20.

In response to initiating the setup dialog display processing shown in FIG. 11, the CPU 11 allows the printing setup dialog representing a current default value as shown in FIG. 9 to be displayed on the display unit 19 based on the printing setup data maintained in the hard disk drive 17 (S510).

In response to terminating the step S510, the CPU 11 waits for user's input until a user inputs operation information through the input unit 20, such as a keyboard 21 or a mouse 23 (S520). In response to inputting the operation information from the input unit 20 ("YES" in the step S520), it is determined whether or not the user's operation is a clicking of a CANCEL key provided on the printing setup dialog based on this operation information (S530). Subsequently, in response to determining that the user's operation is a clicking of a CANCEL key ("YES" in the step S530), the printing setup dialog is closed, and the setup dialog display processing is terminated.

In response to determining that the operation is not a clicking of a CANCEL key ("No" in the step S530), the process proceeds to the step S540, so that the CPU 11 determines whether or not the user's operation is a clicking of an OK key provided on the printing setup dialog. Subsequently, in response to determining that the operation is not a clicking of an OK key ("No" in the step S540), the process proceeds to the step S550.

In the step S550, the CPU 11 determines whether or not the user's operation is a clicking of the user setup key provided on the printing setup dialog. In response to determining that the operation is not the clicking of a user setup key ("NO" in the step S550), the processing corresponding to the user's operation is executed (S560). Specifically, the value displayed on the object (i.e., a default update object) of each parameter formed in the printing setup dialog is updated based on a user's instruction. Subsequently, after this processing is terminated, the process proceeds to the step S520, and the CPU 11 waits for the next operation.

In response to determining that the user's operation is the clicking of an OK key ("YES" in the step 540), the process proceeds to the step S570, so that the CPU 11 updates the registration value of each parameter in the printing setup data as the value set in the printing setup dialog. Then, the printing setup dialog is closed, and the corresponding setup dialog display processing is terminated.

In response to determining that the user's operation is the clicking of a user setup key ("YES" in the step S550), the process proceeds to the step S600, so that the CPU 11 sets the parameter in the user definition data corresponding to the clicked user setup key as a processing target. For example, in response to clicking a user setup key adjacent to the object for changing the default value of the parameter of "the number of pages per a paper (a layout)" in the printing setup dialog, the parameter of "the number of pages per a paper" is set to the processing target. In addition, in response to clicking a user setup key adjacent to the object for changing the default value of "sheet medium" in the printing setup dialog, the parameter of "sheet medium" is set to the processing target.

In response to terminating the step S600, the CPU 11 sets the printing setup dialog as "INACTIVE", and then reads the key setup value and the registration value of the processing target parameter from the user definition data maintained in the hard disk drive 17 and allows the user definition dialog representing the registration value and the key setup value to be displayed on the display unit 19 (S610).

In response to terminating the step S610, the CPU 11 waits for operation information from the input unit 20 created by operating the user input unit 20 such as a keyboard 21 or a mouse 23 (S620). In response to inputting the operation information from the input unit 20 ("YES" in the step S620), it is determined whether or not the user's operation is a clicking of a CANCEL key provided on the user setup dialog based on the operation information (S630).

In response to determining that the user's operation is the clicking of a CANCEL key ("YES" in the step S630), the user setup dialog is closed, and the previously displayed printing setup dialog is set to "ACTIVE", so that the process proceeds to the step S520.

In response to determining that the user's operation is not the clicking of a CANCEL key ("No" in the step S630), the process proceeds to the step S640, so that the CPU 11 determines whether or not the user's operation is a clicking of an OK key provided on the user setup dialog. Subsequently, in response to determining that the clicking is not the clicking of an OK key ("NO" in the step S640), a screen of the user setup dialog is updated based on the user's operation (S650). In other words, the CPU 11 updates the value displayed on the object for instructing change of the key setup value or the object for instructing update of the registration value depending on a user's instruction. In addition, in response to terminating the step S650, the process proceeds to the step S620, so that the CPU 11 waits for the next operation.

In response to determining that the user's operation is the clicking of an OK key provided on the user setup dialog ("YES" in the step S640), the process proceeds to the step S660, so that the CPU 11 updates the key setup value and the registration value of the processing target parameter in the user definition data as the value set in the user setup dialog.

In addition, after the step S660 is terminated, the CPU 11 changes a character of the user setup key corresponding to the processing target parameter in the printing setup dialog to a character representing the updated key setup value. In other words, as shown in FIG. 9, the parenthesized character representing the key setup value in the user setup key is changed to the character representing the key setup value after the update. Then, the CPU 11 closes the user setup dialog, and sets the user setup dialog as "ACTIVE", so that the process proceeds to the step S520.

The printing system according to the second illustrative aspect has been described. In the printing system according to the second illustrative aspect, the PC 10 allows the printing setup dialog capable of receiving an instruction for changing the default value of each parameter based on a user's instruction input through the input unit 20 to be displayed on the display unit 19 (S510). In addition, the screen of the printing setup dialog is updated based on user's operation information for the printing setup dialog obtained from the input unit 20. In response to clicking an OK key, the default value of each parameter represented by the printing setup data is updated to the value corresponding with the value displayed in the printing setup dialog (S570).

The printing setup dialog comprises an object (i.e., the user setup key) for displaying the user setup dialog for each parameter, and the PC allows the user setup dialog of the corresponding parameter to be displayed on the display unit 19 in response to performing the clicking of the aforementioned object through the input unit 20 (S610). In addition, the PC 10 updates a screen of the user setup dialog based on the user's operation information for the user setup dialog obtained from the input unit 20. In response to clicking the OK key, the key setup value and the registration value of the parameter corresponding to the user definition data stored in the hard disk drive 17 are updated as the value corresponding with the value displayed on the user setup dialog (S660).

As described above, in the printing system according to the present illustrative aspect, a user can change the parameter for the user definition data and allocate keys for each parameter using the user setup dialog, as well as operate the setup of the default value. Therefore, according to the present illustrative aspect, a user can operate the setup while an aspect of changing the parameter is imaged. In addition, according to the printing system of the present illustrative aspect, since the content allocated to the key is displayed on the printing setup dialog when there is the user definition data, a user can easily identify whether or not the user definition data is registered, thereby simply executing the operation for allocating the keys.

Although the printing system for allocating keys for each parameter has been described in the aforementioned illustrative aspect, the printing system may allocate a single key for a set of parameters (as will be described below in a third illustrative aspect).

(Illustrative Aspect 3)

A printing system according to a third illustrative aspect modifies the printing system 1 according to the first illustrative aspect so as to form user administration data for administering a plurality of pieces of user definition data in the hard disk drive 17 of the PC 10 and change the content of the printing control processing and the user setup dialog display processing implemented by the printer driver program. Therefore, descriptions for each component similar to those of the printing system of the first illustrative aspect are omitted, and characteristic components of the printing system according to the third illustrative aspect will be selectively described.

FIGS. 12A to 12C illustrate data stored in the hard disk drive 17 of the PC 10 according to the third illustrative aspect. As shown in FIG. 12A, the PC 10 according to the third illustrative aspect comprises a printer driver program, printing setup data as shown in FIG. 2A, user administration data as shown in FIG. 12B, and user definition data as shown in FIG. 12C in the hard disk drive 17.

The user administration data is provided to administer a plurality of pieces of user definition data stored in the hard disk drive 17. Each user definition data comprises a record number, a title, a key setup value representing an identification code of a key for instructing to set the parameter using the user definition data, and a record (data) for designating a storage destination of the user definition data.

In the user definition data according to the third illustrative aspect, each predetermined parameter comprises an item number, a title of the item, a setup ID representing an identification code of the parameter, and a registration value registered as a value set by the this parameter. The predetermined parameter is a part of a plurality of parameters registered in the printing setup data.

Each user definition data is read by the CPU 11 by pressing a corresponding key on the keyboard 21 in response to clicking the printing key through a mouse 23 or inputs a printing instruction, and then, each user definition data is used in response to setting the printing parameter.

For example, as shown in FIG. 12B, when there is a record comprising an identification code of a CTRL key as a key setup value in the user administration data, the CPU 11 reads corresponding user definition data based on the information stored in the storage destination represented by the record comprising the identification code of the CTRL key in response to pressing the CTRL key during the printing instruction is issued. Each parameter represented by the user definition data is set to the aforementioned printing parameter and a printing processing is executed.

Figure 13:
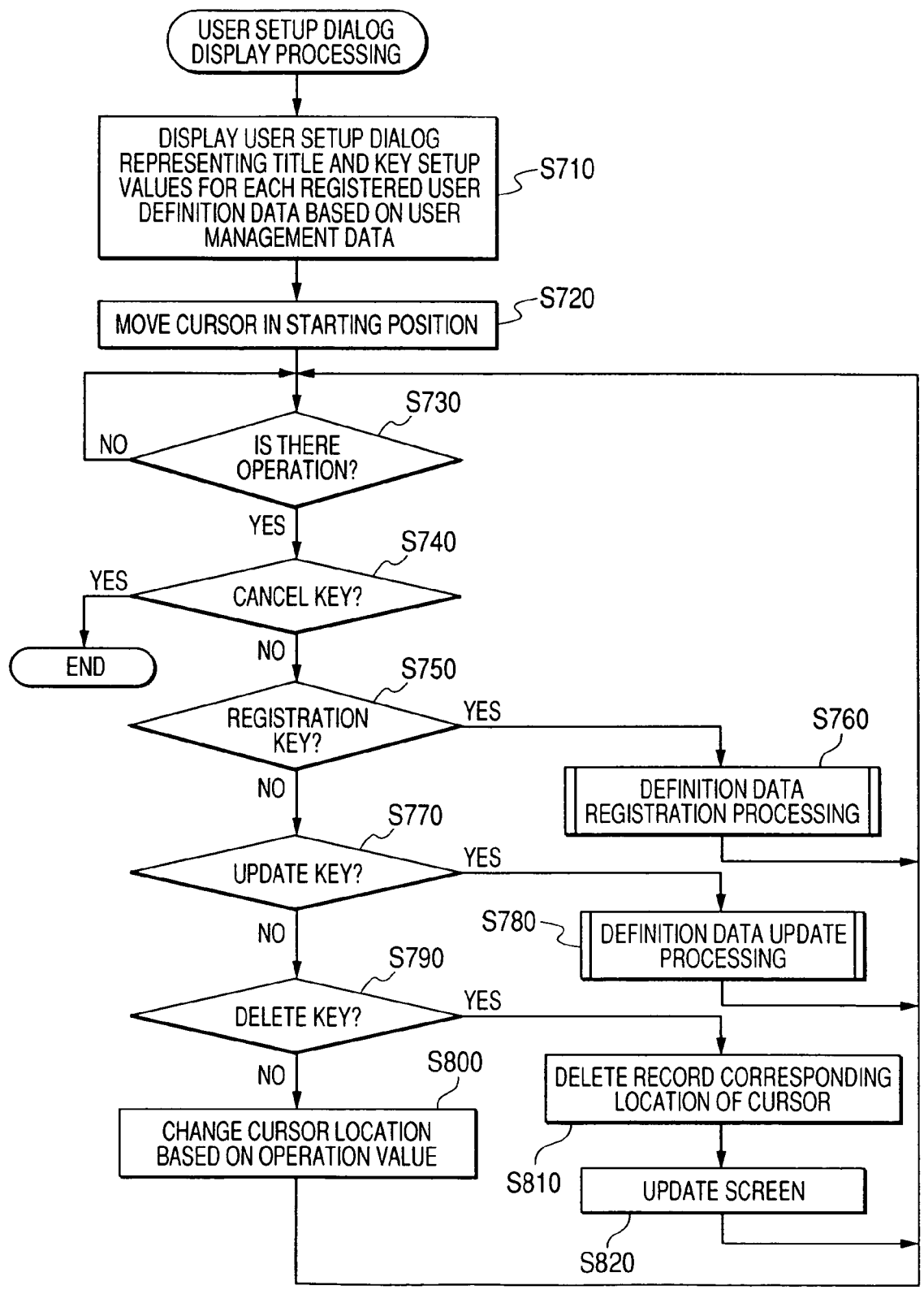
FIG. 13 is a flowchart illustrating a user setup dialog display processing executed by the CPU 11 according to the third illustrative aspect.

The PC 10 according to the present illustrative aspect updates the user administration data based on the user's instruction, and the update of the user administration data is implemented by the user setup dialog display processing shown in FIG. 13. FIG. 13 is a flowchart illustrating a user setup dialog display processing executed by the CPU 11 in response to clicking the user setup key (refer to FIG. 4) in the printing setup dialog through a mouse 23. The user setup dialog display processing is executed by the CPU 11 instead of the user setup dialog display processing shown in FIG. 6, and implemented by the printer driver program.

In response to initiating the user setup dialog display processing shown in FIG. 13, the CPU 11 reads the user administration data maintained in the hard disk drive 17 in the step S710. Then, character information on a title and a key setup value represented by the corresponding record is arranged for each user definition data (i.e., each record) registered in the user administration data, and the user setup dialog shown in FIG. 14A is displayed on the display unit 19. Specifically, in response to registering a title representing a value of "user 1" and records comprising key setup values representing identification codes of the CRTL key and the ALT key in the user administration data, the CPU 11 displays character information made by horizontally arranging characters "user 1" and "CTRL+ALT" on the user setup dialog in the step S710.

As shown in FIG. 14A, the user setup dialog comprises a registration key corresponding to an object for receiving the instruction for registering the user definition data from a user, an update key corresponding to an object for receiving an instruction for updating the user definition data from a user, and a delete key corresponding to an object for receiving an instruction for deleting the user definition data from a user.

In response to terminating the step S710, the process, proceeds to the step S720, so that the CPU 11 locates the cursor on the start position of the character information composed by arranging a plurality of characters. In other words, a processing for locating the cursor on the character information (the title) in the user setup dialog corresponding to the starting record of the user administration data is executed.

In response to terminating the step S720, the CPU 11 waits is for user's input of the operation information generated in response to operating the input unit 20 such as a keyboard 21 or a mouse 23 (S730). In response to inputting the operation information from the input unit 20 ("YES" in the step S730), it is determined whether or not the user's operation is a clicking of a CANCEL key provided on the user setup dialog based on the operation information (S740). Subsequently, in response to determining that the user's operation is the clicking of a CANCEL key ("YES" in the step S740), the user setup dialog is closed, and the user setup dialog display processing is terminated.

In response to determining that the user's operation is not the clicking of a CANCEL key ("NO" in the step S740), the process proceeds to the step S750, so that the CPU 11 determines whether or not the user's operation is a clicking of a registration key provided on the user setup dialog. Subsequently, in response to determined that the user's operation is the clicking of a registration key ("YES" in the step S750), the process proceeds to a definition data registration processing shown in FIG. 15 in the step S760 to register new user definition data, as will be described in detail below. Then, the process proceeds to the step S730.

Figure 16:
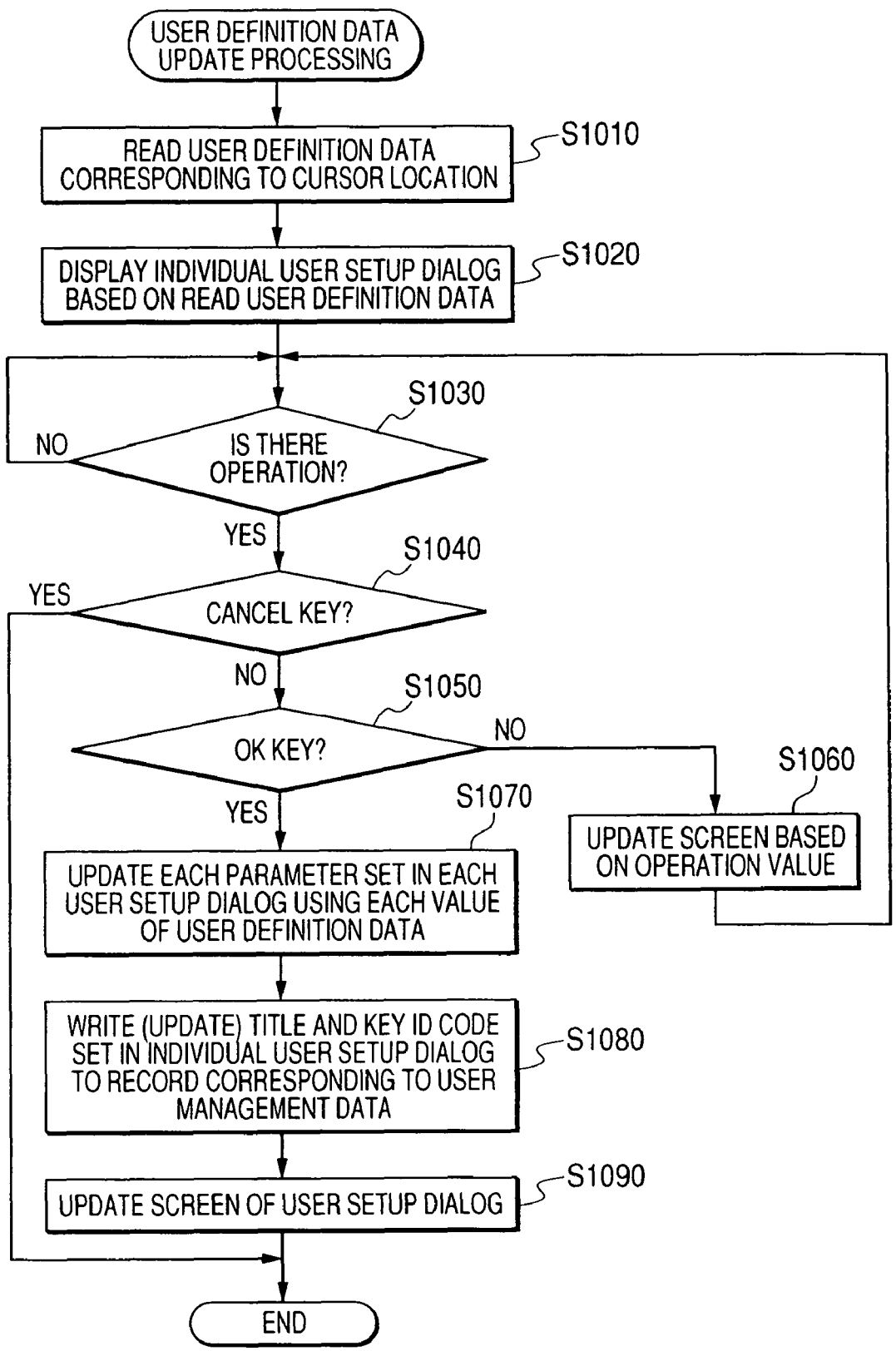
FIG. 16 is a flowchart illustrating a definition data update processing executed by the CPU 11.

In response to determining that the user's operation is not the clicking of a registration key ("No" in the step S750) the process proceeds to the step S770, so that the CPU 11 is determines whether or not the user's operation is a clicking of an update key provided on the user definition dialog. Subsequently, in response to determined that the user's operation is the clicking of an update key ("YES" in the step S770), the definition data update processing shown in FIG. 16 is executed (S780), so that the user definition data corresponding to the character information (a title) having a cursor located in the user setup dialog is set as a processing target, and each parameter represented by this user definition data is updated depending on a user's instruction, as will be described in detail below. Then, the process proceeds to the step S730.

In response to determining that the user's operation is not the clicking of a registration key ("NO" in the step S770), the process proceeds to the step S790, so that the CPU 11 determines whether or not the user's operation is a clicking of a delete key provided on the user setup dialog. Then, in response to determined that the user's operation is the clicking of a delete key ("YES" in the step S790), the process proceeds to the step S810, so that the user definition data corresponding to the character information (i.e., a title) having a cursor located in the user setup dialog is deleted, as well as the record corresponding to this user definition data is deleted in the user administration data. Then, a screen of the user setup dialog is updated to delete the character information corresponding to the deleted record from the user setup dialog (S820). Subsequently, the process proceeds to the step S730.

In response to determining that the user's operation is not the clicking of a delete key ("NO" in the step S790), the process proceeds to the step S800, so that the CPU 11 executes a corresponding process depending on the operation information input by a user. Specifically, a processing for changing the location of a cursor in the user setup dialog depending on the user's operation is executed. Then, the process proceeds to the step S730.

As described above, the user definition data is registered, updated, or deleted depending on a user's instruction in the user setup dialog display processing. Subsequently, details of the registration and update operation will be described with reference to FIGS. 15 and 16.

Figure 15:
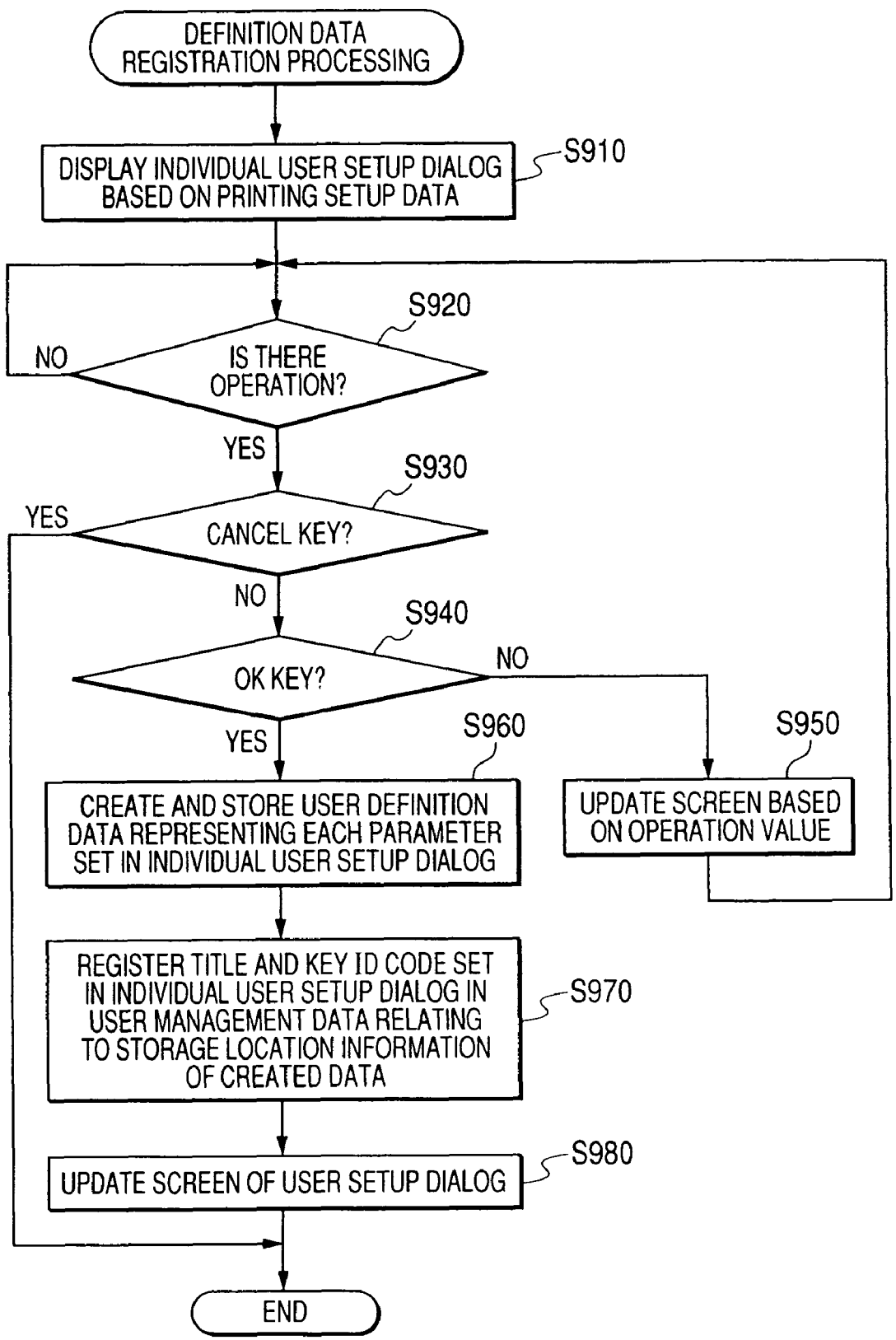
FIG. 15 is a flowchart illustrating a definition data registration processing executed by the CPU 11.

FIG. 15 is a flowchart illustrating a definition data registration processing executed by the CPU 11 in the step S760. In response to initiating the definition data registration processing, the CPU 11 sets the user setup dialog, which is being displayed, to an "INACTIVE" state, reads the printing setup data from the hard disk drive 17, so that an individual user setup dialog representing a default value of a parameter as shown in FIG. 14B based on this printing setup data is displayed on the display unit 19 (S910). In addition, FIG. 14B illustrates the individual user setup dialog.

As shown in FIG. 14B, the individual user setup dialog comprises an object for inputting a title (for example, a text input field), an object for receiving each parameter registered in the user definition data (for example, a pull-down type input field), and an object for registering a key setup value (for example, a pull-down type input field).

In response to terminating the step S910, the CPU 11 waits for user's input of the operation information generated in response to operating the input unit 20, such as a keyboard 21 or a mouse 23 (S920). In response to inputting the operation information from the input unit 20 ("YES" in the step S920), it is determined whether or not the user's operation is a clicking of a CANCEL key provided on the individual user setup dialog based on the operation information (S930). Then, in response to determining that the user's operation is the clicking of a CANCEL key ("YES" in the step S930), the individual user setup dialog is closed, and the user setup dialog is set to an "ACTIVE" state, so that the corresponding data registration processing is closed.

In response to determining that the user's operation is not the clicking of a CANCEL key ("NO" in the step S930), the process proceeds to the step S940, and the CPU 11 determines whether or not the user's operation is a clicking of an OK key provided on the individual user setup dialog. Then, in response to determining that the user's operation is not the clicking of an OK key ("NO" in the step S940), a processing corresponding to the user's operation is executed (S950). Specifically, the values displayed on each object provided on the individual user setup dialog are updated depending on a user's instruction. Then, the process proceeds to the step S920, so that the CPU 11 waits for the next operation.

In response to determining that the user's operation is the clicking of an OK key ("YES" in the step S940), the process proceeds to the step S960, so that the CPU 11 newly creates user definition data, which describes each parameter (other than the title and the key setup value) set in the individual user setup dialog as shown in FIGS. 12A to 12C, and stores the user definition data in the hard disk drive 17.

In response to terminating the step S960, the process proceeds to the step S970, so that the CPU 11 relates the key setup value and the title set in the individual user setup dialog with the information representing a storage location of the user definition data created in the step S960 and registers the key setup value and the title to the user administration data. In addition, after the step S980 is terminated, a screen of the user setup dialog is updated, and each record value represented by the updated user administration data is reflected on the user setup dialog. In addition, after this processing is terminated, the individual user setup dialog is closed, and the user setup dialog is set to an "ACTIVE" state, so that the definition data registration processing is terminated.

FIG. 16 is a flowchart illustrating a definition data update processing executed by the CPU 11 in the step S780. In response to initiating the definition data update processing, the CPU 11 sets the user setup dialog, which is being displayed, to an "INACTIVE" state, reads, from the hard disk drive 17, the user definition data corresponding to a cursor location as a processing target by referring to the record in the user administration data corresponding to the cursor location set in the user definition dialog (S1010). In addition, the individual user setup dialog representing each parameter registered in this user definition data as shown in FIG. 14B is displayed on the display unit 19 based on the read user definition data (S1020). In addition, the key setup value and the title represented by the referred record are displayed in the individual user setup dialog in the step S1020.

In response to terminating the step S1020, the CPU 11 waits for user's input of the operation information generated in response to operating the input unit 20 such as a keyboard 21 or a mouse 23 (S1030). In response to inputting the operation information from the input unit 20 ("YES" in the step S1030), it is determined whether or not the user's operation is a clicking of a CANCEL key provided on the individual user setup dialog based on the operation information (S1040). Then, in response to determining that the user's operation is the clicking of a CANCEL key ("YES" in the step S1040), the individual user setup dialog is closed, and the user setup dialog is set to an "ACTIVE" state, so that the data update processing is terminated.

In response to determining that the user's operation is not the clicking of a CANCEL key ("NO" in the step S1040), the process proceeds to the step S1050, so that the CPU 11 determines whether or not the user's operation is a clicking of an OK key provided on the individual user setup dialog. Then, in response to determining that the user's operation is not the clicking of an OK key ("NO" in the step 1050), a processing corresponding to a user's instruction is executed (S1060). Specifically, the value displayed on each object provided in the individual user setup dialog is updated depending on a user's instruction. Then, the process proceeds to the step S1030, so that the CPU 11 waits for the next operation.

The user's operation is not the clicking of an OK key ("YES" in the step S1050), the process proceeds to the step S1070, so that the CPU 11 updates each parameter represented by the user definition data of the processing target to the value set in the individual user setup dialog.

In response to terminating the step S1070, the process proceeds to the step S1080, so that the CPU 11 updates a key setup value and a title represented by the record in the user administration data corresponding to the aforementioned user definition data to a key setup value or a title set in the individual user setup dialog. In addition, in response to terminating this processing, the process proceeds to the step S1090, so that a screen of the user setup dialog is updated, and each record value represented by the updated user administration data is reflected on the user setup dialog. Subsequently, the individual user setup dialog is closed, and the user setup dialog is set to an "ACTIVE" state, so that the definition data update processing is terminated Finally, a printing control processing executed by the PC 10 according to the third illustrative aspect based on the printer driver program will now be described with reference to FIG. 17. FIG. 17 is a flowchart illustrating a printing control processing according to the third illustrative aspect executed by the CPU 11. The printing control processing is executed by the CPU 11 unlike the printing control processing shown in FIG. 7.

In response to initiating the printing control process shown in FIG. 17, the CPU 11 sets the user data, which is being displayed by a task receiving the printing instruction to printing target data in the step 1110. In addition, the printing setup data maintained in the hard disk drive 17 is read in the step S1120, and each parameter represented by the printing setup data is set to a printing parameter for determining operation of the printing processing.

After this processing is terminated, the CPU 11 determines whether or not there is a pressed key in the keyboard 21 in response to inputting the printing instruction based on the input signal obtained from the keyboard 21 in response to inputting the printing instruction (S1130). Then, in response to determined that there is no pressed key ("NO" in the step S1130), the process proceeds to the step S1190, so that the to-be-printed data is processed based on the currently set each printing parameter, and a control signal for printing an image formed by the to-be-printed data on a paper through the printer 3 is input to the printer 3 through an interface 25.

In response to determining that there is a pressed key ("YES" in the step S1130), the CPU 11 identifies a pressed key in response to inputting the printing instruction (S1140), and set the number of the pressed keys to a variable N (S150). In addition, the user administration data maintained in the hard disk drive 17 is read (S1160), and it is determined whether or not there is a record, where identification codes of N keys are registered as the key setup value, in the user administration data (S1170).

In response to determining that there is the record where identification codes of N keys are registered ("YES" in the step S1170), the process proceeds to the step S1180, so that the printing parameter update processing is executed as shown in FIG. 18. On the contrary, in response to determining that there is no record where identification codes of N keys are not registered ("NO" in the step S1170), the process skips the step S1180, and proceeds to the step S1190.

FIG. 18 is a flowchart illustrating a printing parameter update processing according to the third illustrative aspect executed by the CPU 11 in the step S1180. In the step S1180, in response to initiating the printing parameter update processing, the CPU 11 selects that record (the record where identification codes of N keys are registered) in the user administration data as a processing target (S1210). Then, it is determined whether or not all the keys represented by the key setup values of the selected processing target record are pressed in response to inputting the printing instruction (S1220). In this case, in response to determining that all the keys are pressed ("YES" in the step S1220), the corresponding user definition data is read from the hard disk drive 17 based on the information stored in the storage location represented by the processing target record, and the registration value of each parameter represented by this user definition data is set to the corresponding printing parameter (S1230). Then, the printing parameter update processing is terminated.

In response to determining that at least one of the keys represented by the key setup value of the processing target record is not the pressed key in response to inputting the printing instruction ("NO" in the step S1220), the process proceeds to the step S1240, so that the CPU 11 determines whether or not the processes followed by the step S1220 have been executed for all the corresponding records (the records where identification codes of N keys are registered) in the user administration data. In response to determining that the processes followed by the step S1220 is not executed ("NO" in the step S1240), the process proceeds to the step S1210. Then, the processes followed by the step 1220 are executed by selecting one of the unprocessed records as a processing target. On the contrary, in response to determining that the processes followed by the step S1220 are executed for all the records ("YES" in the step S1240), the printing parameter update processing is terminated.

In response to terminating the printing parameter update processing in the step S1180, the process proceeds to the step S1190, so that the CPU 11 executes a printing processing for the to-be-printed data based on the setup value of the current printing parameter that has been updated through the printing parameter update processing, and outputs a control signal for printing an image based on the to-be-printed data on a paper using a printing mode represented by the printing parameter to the printer 3 through the interface 25. Then, the printing control processing is terminated.

Although the printing system according to the third illustrative aspect has been described, in the printing system according to the third illustrative aspect, in response to inputting the printing instruction from a user, the PC 10 executes a printing processing for the to-be-printed data based on the setup value of a parameter relating to a printing mode (i.e., a printing parameter) and forms an image based on the to-be-printed data using a printing mode corresponding to the setup value of the printing parameter on a printer (S1190).

In response to inputting an instruction for registering the user definition data from a user through the input unit 20, the PC 10 allows the individual user setup dialog to be displayed on the display unit 19, and the user definition data representing the parameter relating to the printing mode designated by a user is created based on the user's instruction obtained through this dialog and registered in the hard disk drive 17. In addition, the key setup value representing identification code of a key for setting the parameter is related with the user definition data and registered in the user administration data (S760).

The PC 10 determines which one of the keys represented by the key setup value registered in each record of the user administration data is pressed in response to inputting the printing instruction (e.g., in response to describing identification codes of a plurality of keys as the key setup value, all of those keys should be pressed). In response to determining that the key registered in the user administration data is not pressed, a default value is determined to be a value set in the printing parameter. Otherwise, in response to determining that the corresponding key is pressed, a value of the user definition data related with the pressed key is set to the printing parameter.

According to aspects of the invention, a user can instruct the PC 10 to execute a printing processing using the default value or the user definition data set by a user, by pressing or not pressing a particular key in response to inputting the printing instruction. In addition, according to the present illustrative aspect, since a plurality of pieces of user definition data can be registered, when a plurality of users shares a PC 10, each user can execute a desired printing processing on the PC 10 by a simple operation through the printing setup dialog without changing the default value.

A printing control apparatus and a program according to aspects of the invention are not limited to the aforementioned illustrative aspects, but various variations and modifications can be made thereto. For example, although it has been described that only a part of the parameters provided in the printing setup data are registered in the user definition data, all the parameters provided in the printing setup data can be registered in the user definition data.

Although the PC 10 (i.e., the printer driver program) according to the present illustrative aspect executes the printing processing by changing the printing parameter based on the user definition data only in response to pressing the corresponding key, the PC 10 may execute the printing processing based on the user definition data in the printing processing after the corresponding key is pressed. In this case, for example, a history of pressing the key maybe recorded, so that the PC 10 may set the printing parameter by referring to the history whenever the printing instruction is input.

In response to pressing the PC 10 uses the printing parameter changed by pressing a particular key in the printing processing even after the corresponding key as described above, it would be preferable to provide a key (e.g., a return key) for returning the changed value to the original value (i.e., the default value). The return key may be similar to the key (i.e., the aforementioned particular key) used to change the printing parameter, or separately provided as a dedicated key. When the return key is similar to the key used to change the printing parameter based on the user definition data, a user can easily change the printer parameter to the default value or its registration value just by pressing the particular key, thereby guaranteeing convenience.

What is claimed is:

1. A printing control apparatus comprising:
   an input unit comprising a plurality of operable keys;
   a display unit configured to display image data;
   a printing key, wherein the input unit sends a print command for initiating a print job of the image data displayed on the display unit at a printer at the same time that the printing key is selected;
   a printing control unit that receives the print command sent from the input unit;
   a determination unit that determines whether a predetermined key, different from the printing key, is pressed at the same time that the printing key is selected;
   a storage unit that stores user definition data corresponding to a parameter relating to a printing mode of the print job;
   a setting unit that sets the parameter in the printing control unit based on a result of a determination by the determination unit,
   wherein, when the determination unit determines that the predetermined key is pressed at the same time that the print command is received, the setting unit:
      reads the user definition data corresponding to the pressed predetermined key from the storage unit;
      updates a setup value of a parameter relating to a printing mode of the print job to a specific value of the user definition data from a predetermined default value; and
      selects the specific value of the user definition data for the parameter in the printing control unit,
   wherein, when the determination unit determines that the predetermined key is not pressed at the same time that the print command is received, the setting unit selects the predetermined default value for the parameter in the printing control unit, and wherein the printer executes the print job of the image data displayed on the display unit in accordance with the parameter set by the setting unit; and a recording device that records a history of pressing another key of the plurality of operable keys different from the printing key at the same time the printing key is selected, wherein the setting unit updates another setup value of another parameter relating to the printing mode of the print job to a specific value based on the history of pressing the another key when the printing key is selected.

2. The printing control apparatus of claim 1, further comprising:

an update unit that updates the user definition data stored in the storage unit to the specific value based on an input signal from the input unit.

3. The printing control apparatus of claim 2, wherein:

the printing mode set by the setting unit comprises a plurality of parameters, the user definition data comprises a plurality of values corresponding to at least some of the plurality of parameters set by the setting unit, the setting unit selects the predetermined default value for a particular parameter in the printing control unit when the value of the particular parameter is not comprised in the user definition data, and the setting unit selects the predetermined default value or the value of the user definition data for the particular parameter in the printing control unit based on the result of the determination of the determination unit, when the value of the particular parameter is comprised in the user definition data.

4. The printing control apparatus of claim 3, wherein:

an individual key is allocated as the predetermined key to the particular parameter, a value of which is comprised in the user definition data, the determination unit determines, for the predetermined key set for the particular parameter, whether the predetermined key is pressed in response to inputting the printing instruction, in response to determining that the predetermined key is pressed, the setting unit selects the value of the user definition data for the particular parameter in the printing control unit for the predetermined key, and in response to determining that the predetermined key is not pressed, the setting unit selects the default value for the parameter in the printing control unit for the predetermined key.

5. The printing control apparatus of claim 3, wherein:

the storage unit comprises key definition data comprising an identification code of a parameter setup key based on the user definition data for each parameter, a value of which is comprised in the user definition data, the update unit individually updates each identification code of each key comprised in the key definition data to an identification code of a key designated by an input based on the input signal from the input unit, the determination unit determines whether each key is pressed in response to inputting the printing instruction, an identification code corresponding to the key being registered in the key definition data as the predetermined key, and in response to determining that the predetermined key is pressed, the setting unit selects the value of the user definition data for the parameter in the printing control unit for the predetermined key, and in response to determining that the predetermined key is not pressed, the setting unit selects the predetermined default value for the parameter in the printing control unit for the predetermined key.

6. The printing control apparatus of claim 2, wherein:

the storage unit comprises key definition data corresponding to a parameter setup key based on the user definition data, the update unit updates the parameter setup key represented by the key definition data to a key designated by an input based on the input signal from the input unit, and the determination unit determines whether the parameter setup key represented by the key definition data as the predetermined key is pressed in response to inputting the printing instruction.

7. The printing control apparatus of claim 6, further comprising:

a dialog display unit that controls the display unit to display a dialog, which receives the change instruction for the predetermined default value of the parameter set by the setting unit, according to an instruction input through the input unit, and a default value change unit that changes the predetermined default value of the parameter set by the setting unit according to the change instruction obtained by operation of the dialog through the input unit, wherein:

the dialog comprises an object for displaying a user setup dialog, which receives an instruction for updating the key definition data, the printing control apparatus further comprises a user setup dialog display unit that controls the display unit to display the user setup dialog in response to operating the object through the input unit, and the update unit updates the key definition data stored in the storage unit to key definition data representing a designated key according to an update instruction for the key definition data, the update instruction being obtained from the user setup dialog by operating the user setup dialog through the input unit.

8. The printing control apparatus of claim 2, further comprising:

a dialog display unit that controls the display unit to display a dialog, which receives a change instruction to change the default value of the parameter set by the setting unit, based on an instruction input through the input unit; and a default value change unit that changes the default value of the parameter set by the setting unit based on the change instruction obtained by operation of the dialog through the input unit, wherein:

the dialog comprises an object that displays a user setup dialog, which receives an instruction to update the user definition data, the printing control apparatus further comprises a user setup dialog display unit that controls the display unit to display the user setup dialog in response to operating the object through the input unit, and the update unit updates the user definition data stored in the storage unit to user definition data representing the specific value according to an update instruction for the user definition data, the update instruction being obtained from the user setup dialog by operating the user setup dialog through the input unit.

9. The printing control apparatus of claim 1, further comprising:
   a registration unit that generates user definition data representing a particular parameter relating to the printing mode based on an input signal from the input unit, that registers the user definition data in the storage unit, and that registers an identification code of a parameter setup key based on the user definition data in the storage unit in relation with the registered user definition data, wherein:
      the determination unit determines whether a key is pressed in response to inputting the printing instruction, an identification code corresponding to the key being registered in the storage unit indicating that the key is the predetermined key,
      in response to determining that the predetermined key is not pressed, the setting unit selects the predetermined default value for the parameter, and
      in response to determining that the predetermined key is pressed, the setting unit selects the specific value of the user definition data for the parameter based on the user definition data stored in the storage unit in relation to the identification code of the predetermined key.

10. The printing control apparatus of claim 1, wherein the input unit comprises:
   a pointing device for selecting the printing key; and
   a keyboard comprising the plurality of operable keys which are configured to generate an input signal when pressed.

11. A non-transitory computer readable medium storing software instructions for enabling a computer to control printing, the software instructions comprising the steps of:
   receiving a print command from an input unit comprising a plurality of keys, wherein the print command initiates a print job at a printer;
   sending the print command from the input unit at the time a printing key is selected, wherein the print command is a command for initiating a print job of image data displayed on a display at the same time that the printing key is selected;
   determining whether a predetermined key, different from the printing key, is pressed at the same time that the printing key is selected;
   storing user definition data corresponding to a parameter relating to a printing mode of the print job;
   setting the parameter in the printing control unit based on a result of a determination of whether a predetermined key, different from the printing key, is pressed at the same time that the printing key is selected;
   reading the stored user definition data corresponding to the pressed predetermined key when it is determined that the predetermined key is pressed at the same time that the print command is received;
   updating a setup value of a parameter relating to a printing mode of the print job to a specific value of the user definition data from a predetermined default value when it is determined that the predetermined key is pressed at the same time that the print command is received;
   selecting the specific value of the user definition data for the parameter when it is determined that the predetermined key is pressed at the same time that the print command is received;
   selecting the predetermined default value for the parameter when it is determined that the predetermined key is not pressed at the same time that the print command is received;
   executing the print job of the image data displayed on the display in accordance with the parameter; and recording a history of pressing another key of the plurality of keys different from the printing key at the same time the printing key is selected, wherein the setting step further comprises updating another setup value of another parameter relating to the printing mode of the print job to a specific value based on the history of pressing the another key when the printing key is selected.

* * * * *